J. DE BLONAY.
PACKING AND WRAPPING MACHINE.
APPLICATION FILED SEPT. 2, 1913.
1,136,412.
Patented Apr. 20, 1915.
12 SHEETS—SHEET 3.
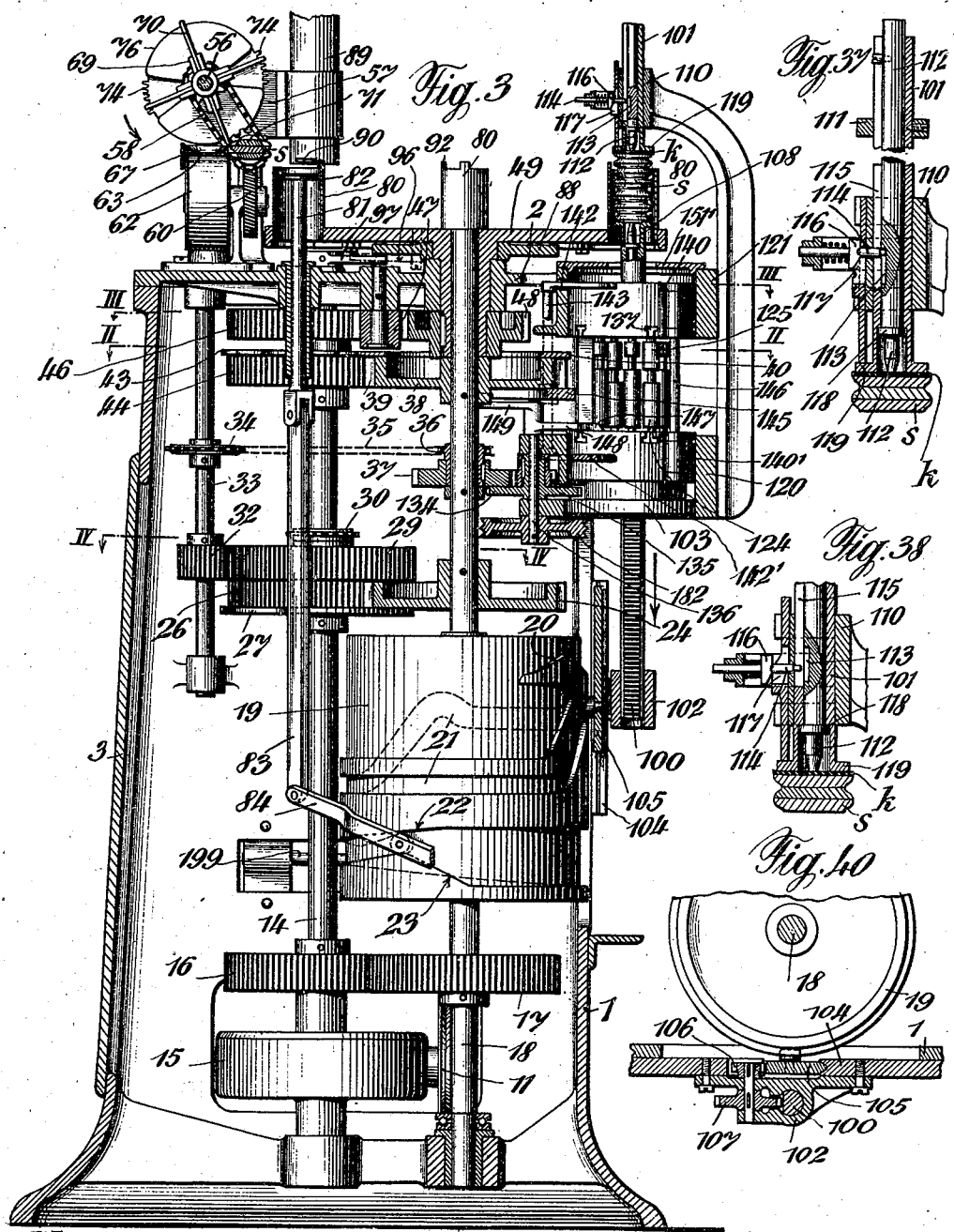
Witnesses:
P. Dommers
E. Leckert
Inventor:
Jean de Blonay
by Henry Orth
atty.

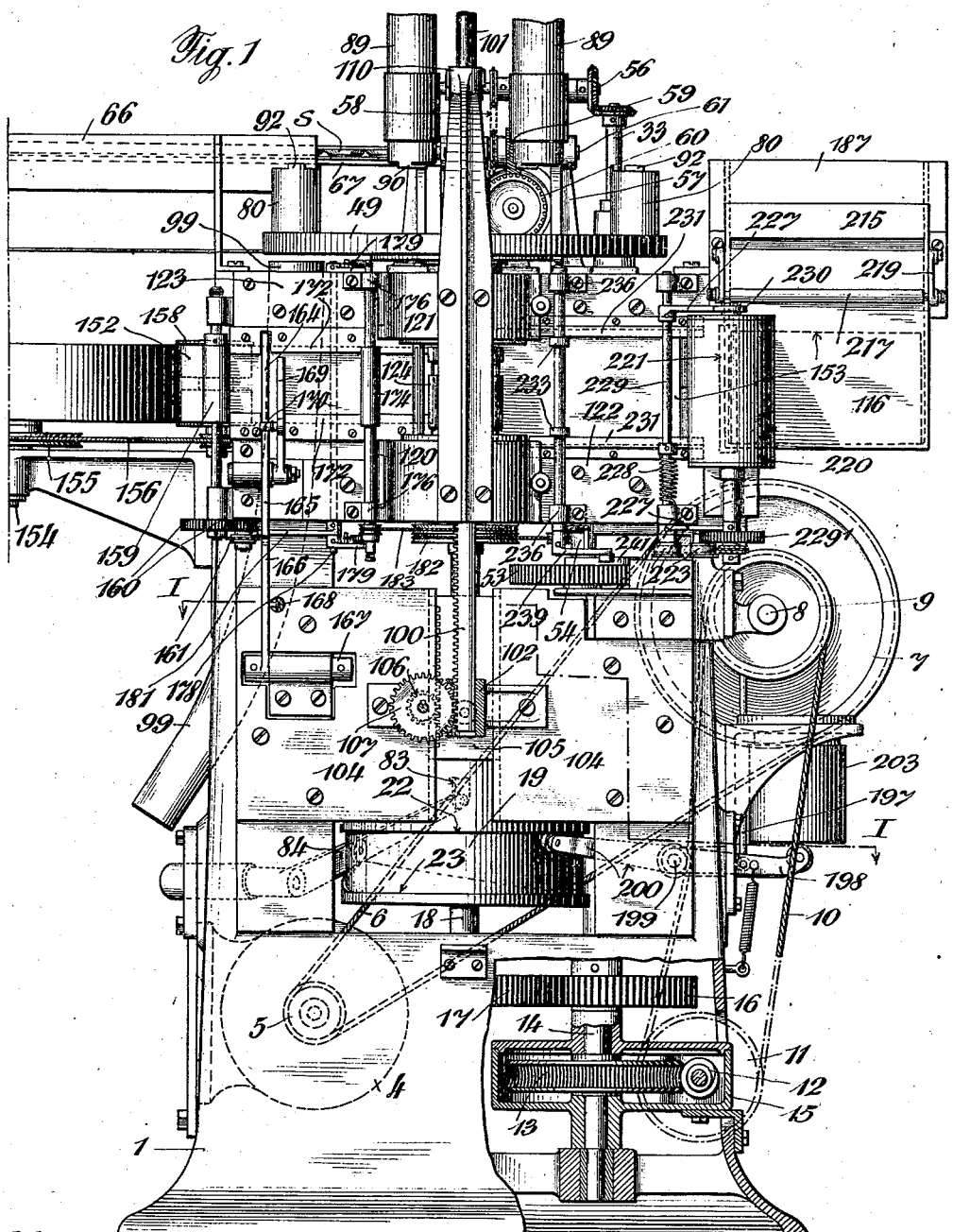

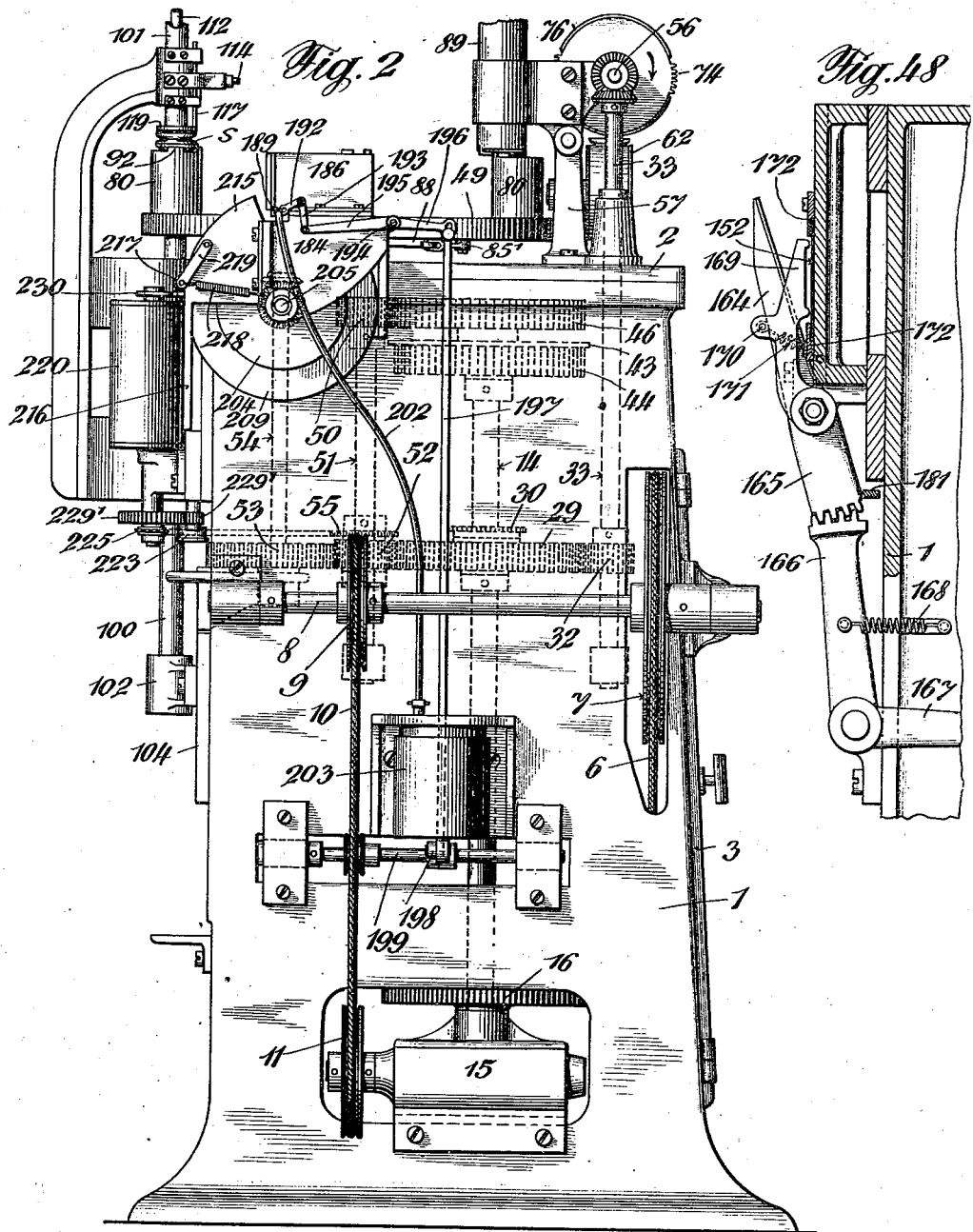

J. DE BLONAY.
PACKING AND WRAPPING MACHINE.
APPLICATION FILED SEPT. 2, 1913.
1,136,412.  Patented Apr. 20, 1915.
12 SHEETS—SHEET 4.
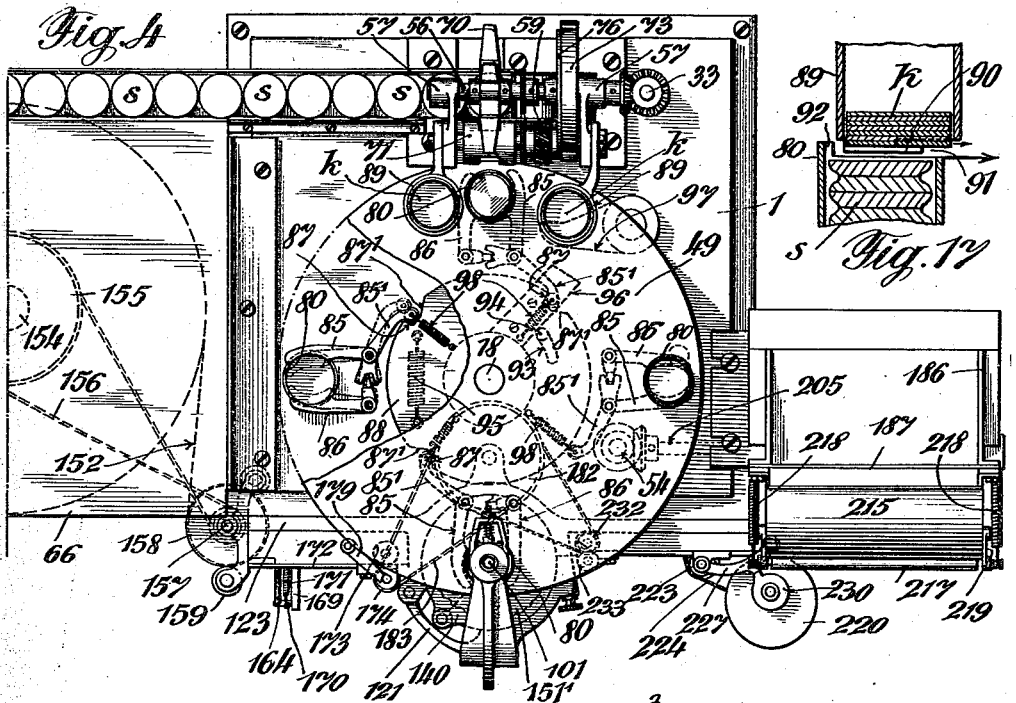
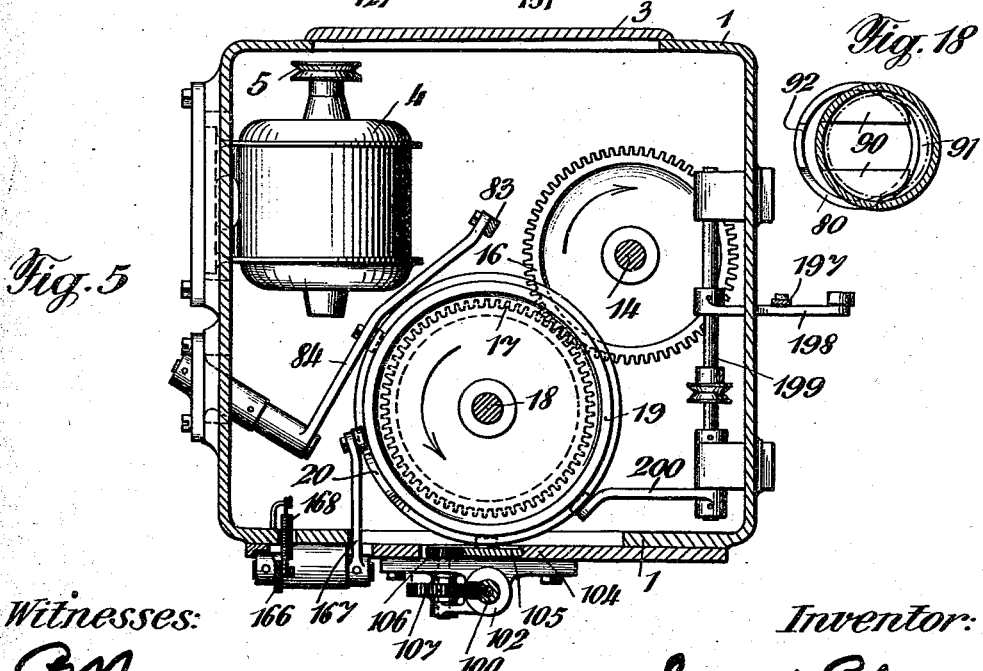
Witnesses: Inventor: Jean de Blonay

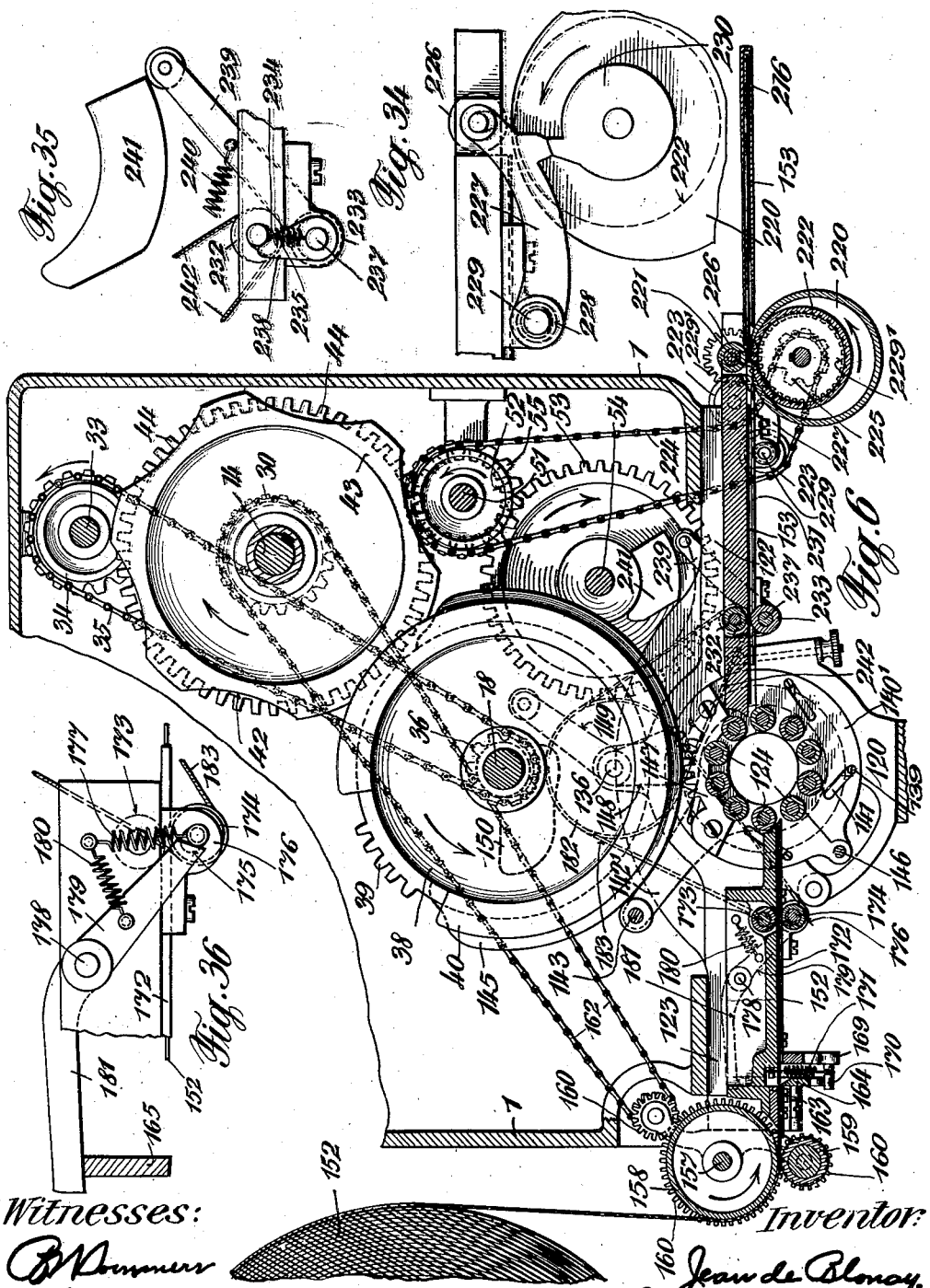

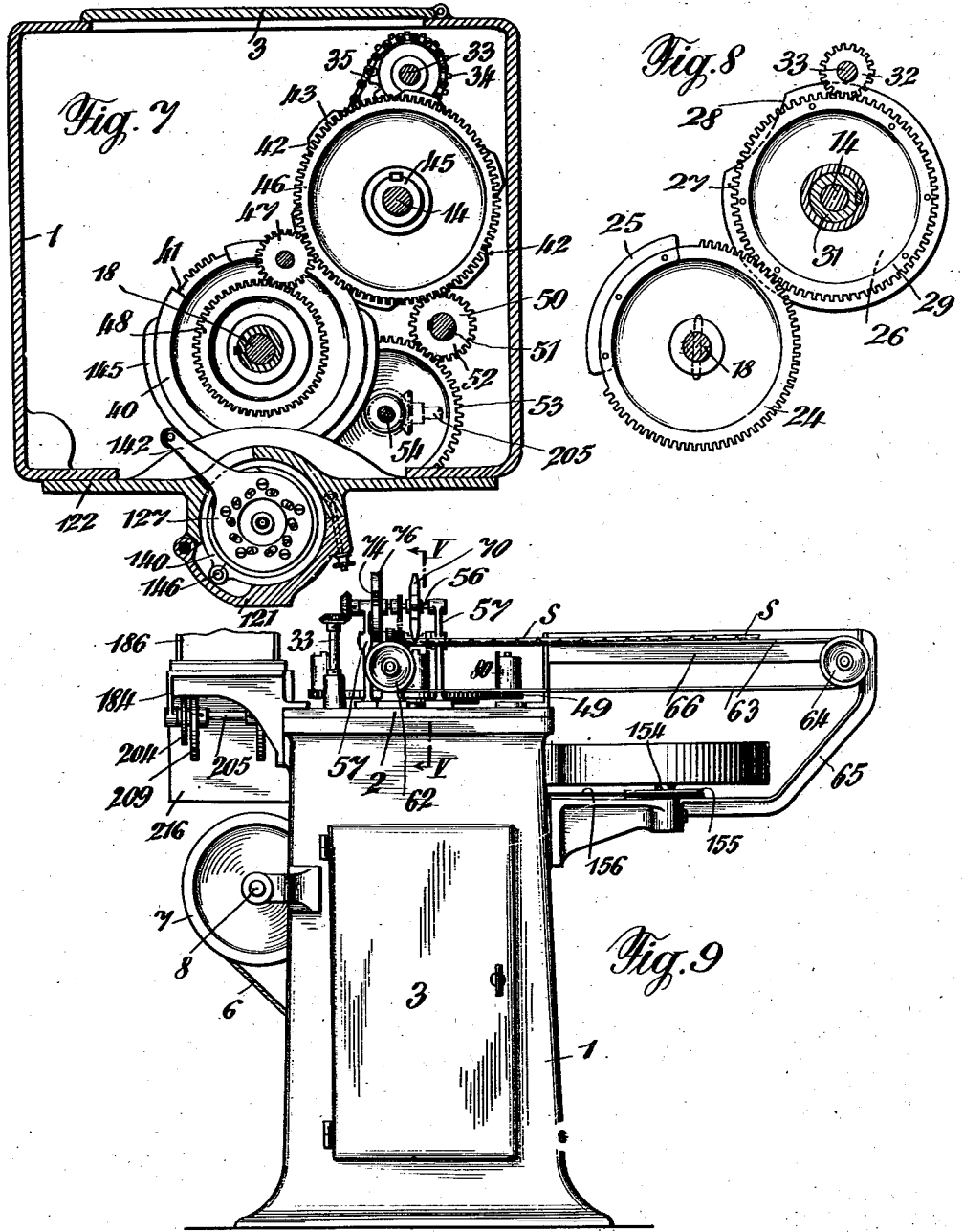

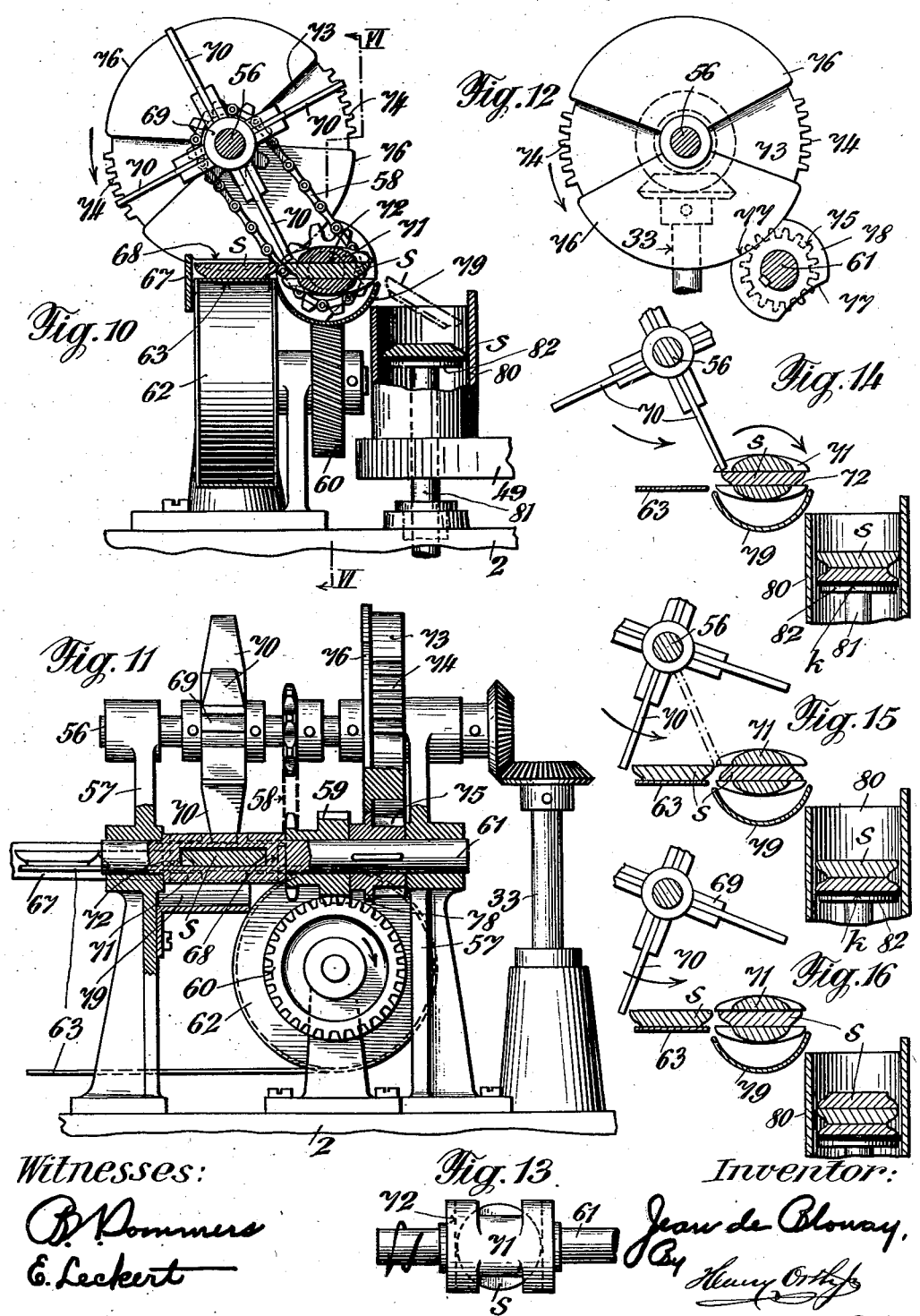

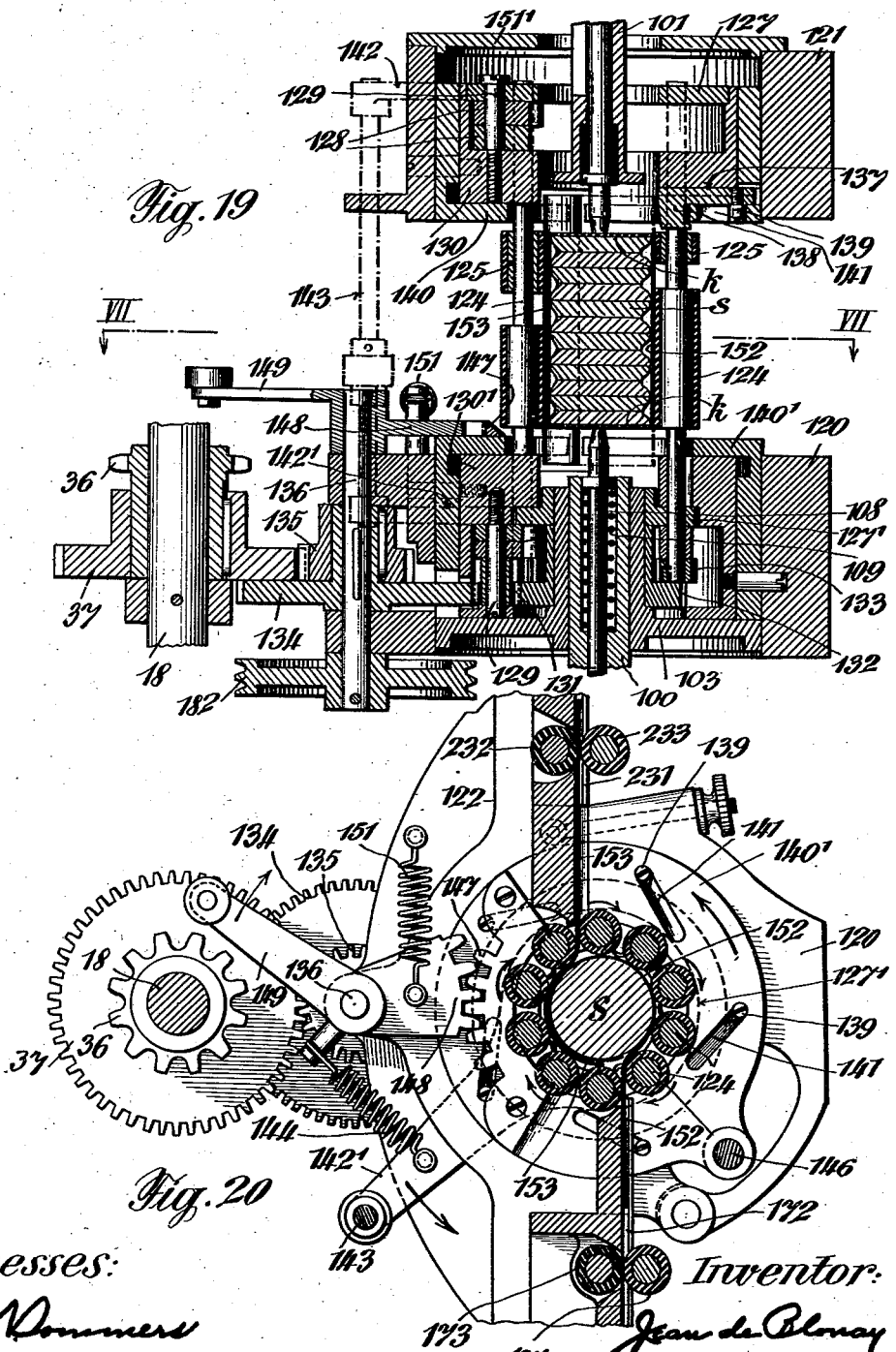

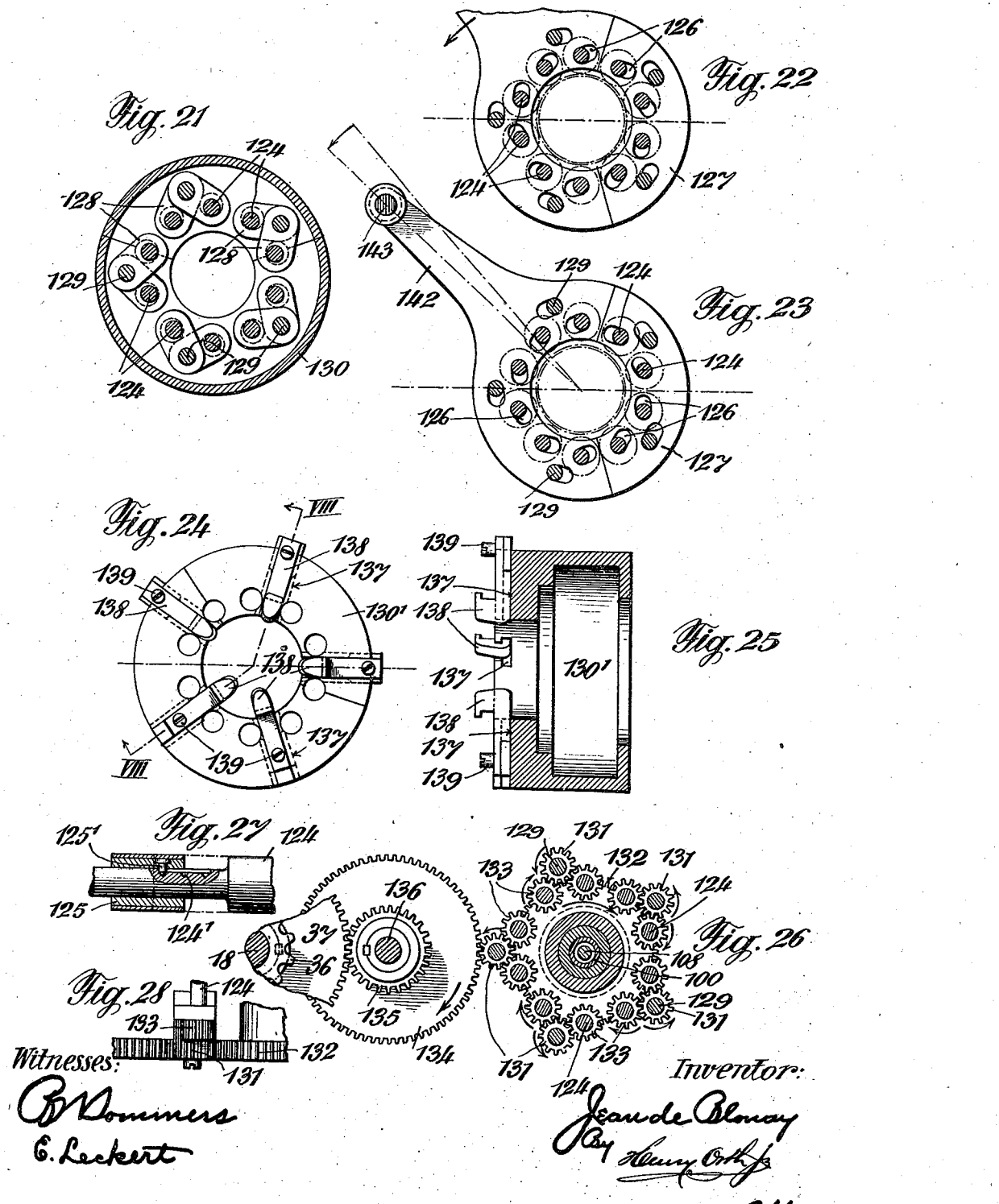

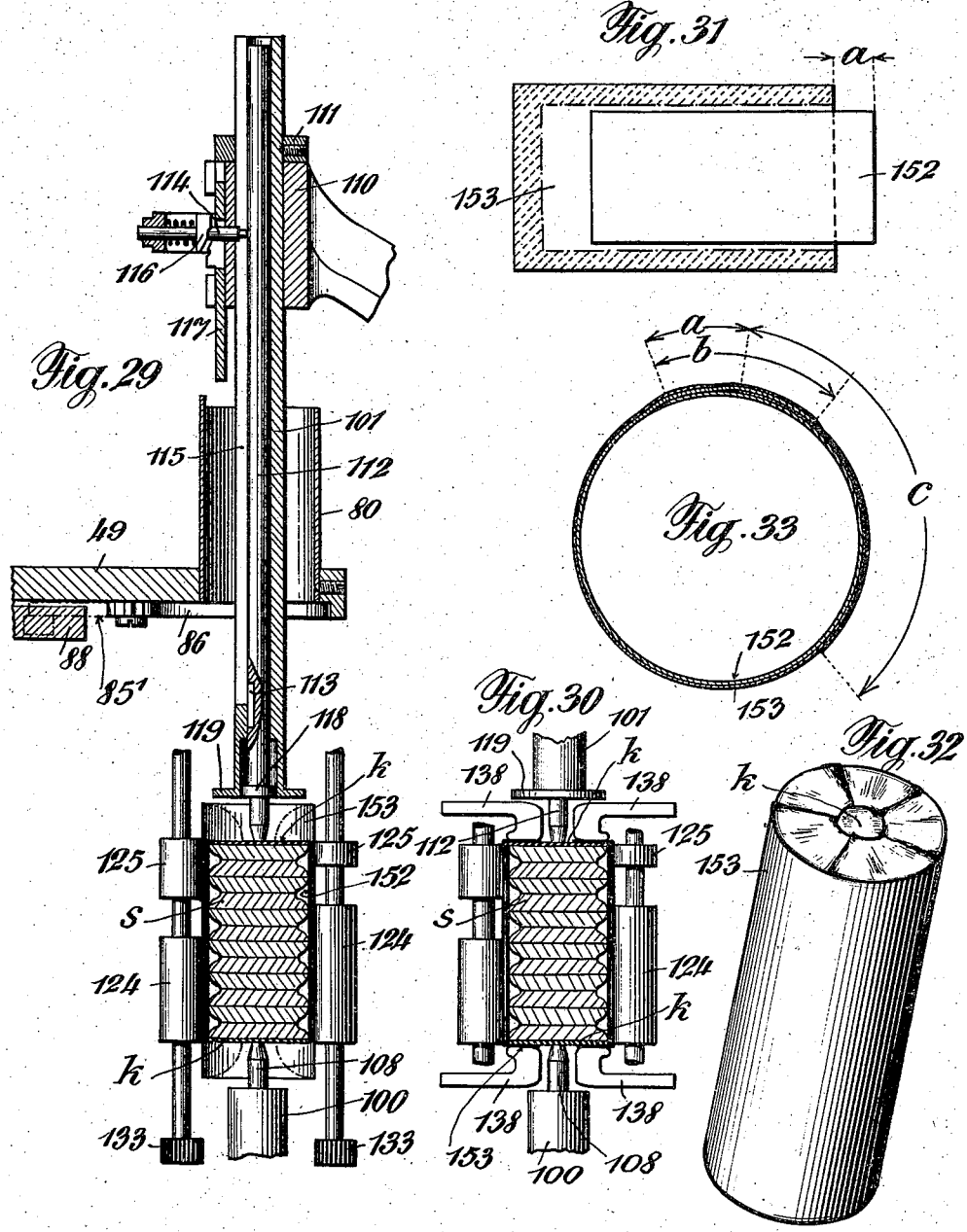

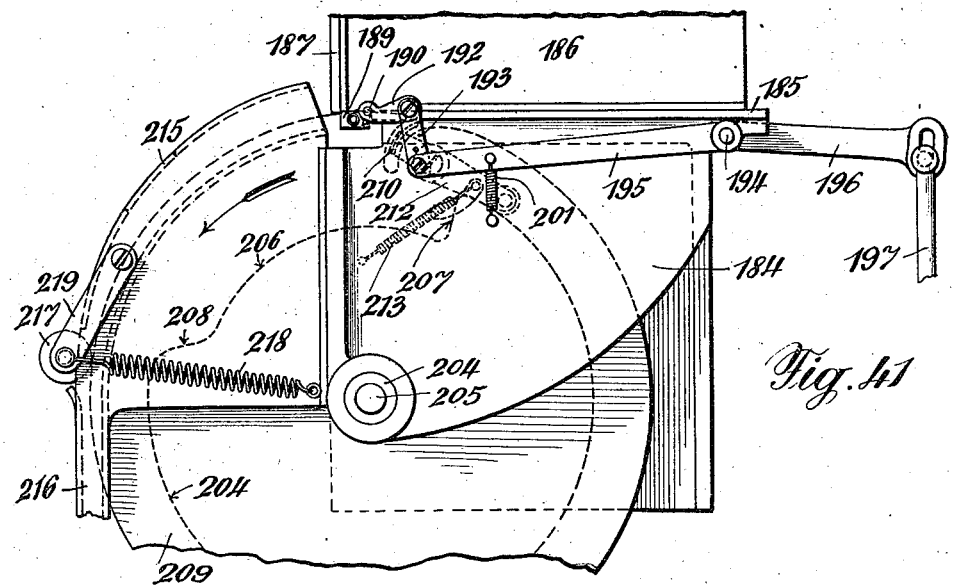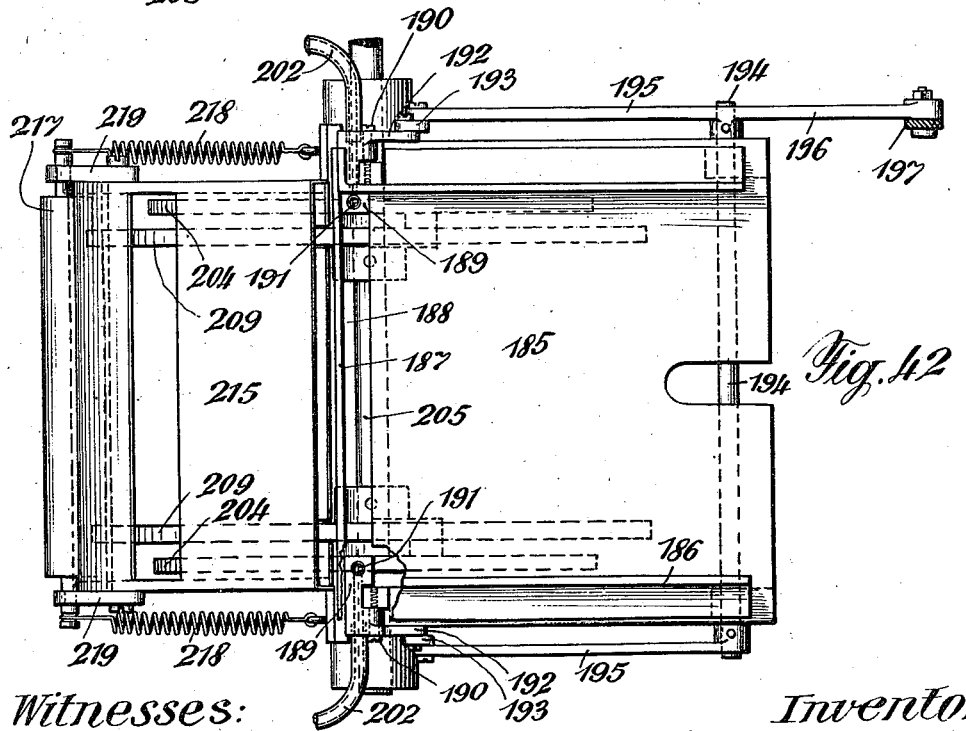

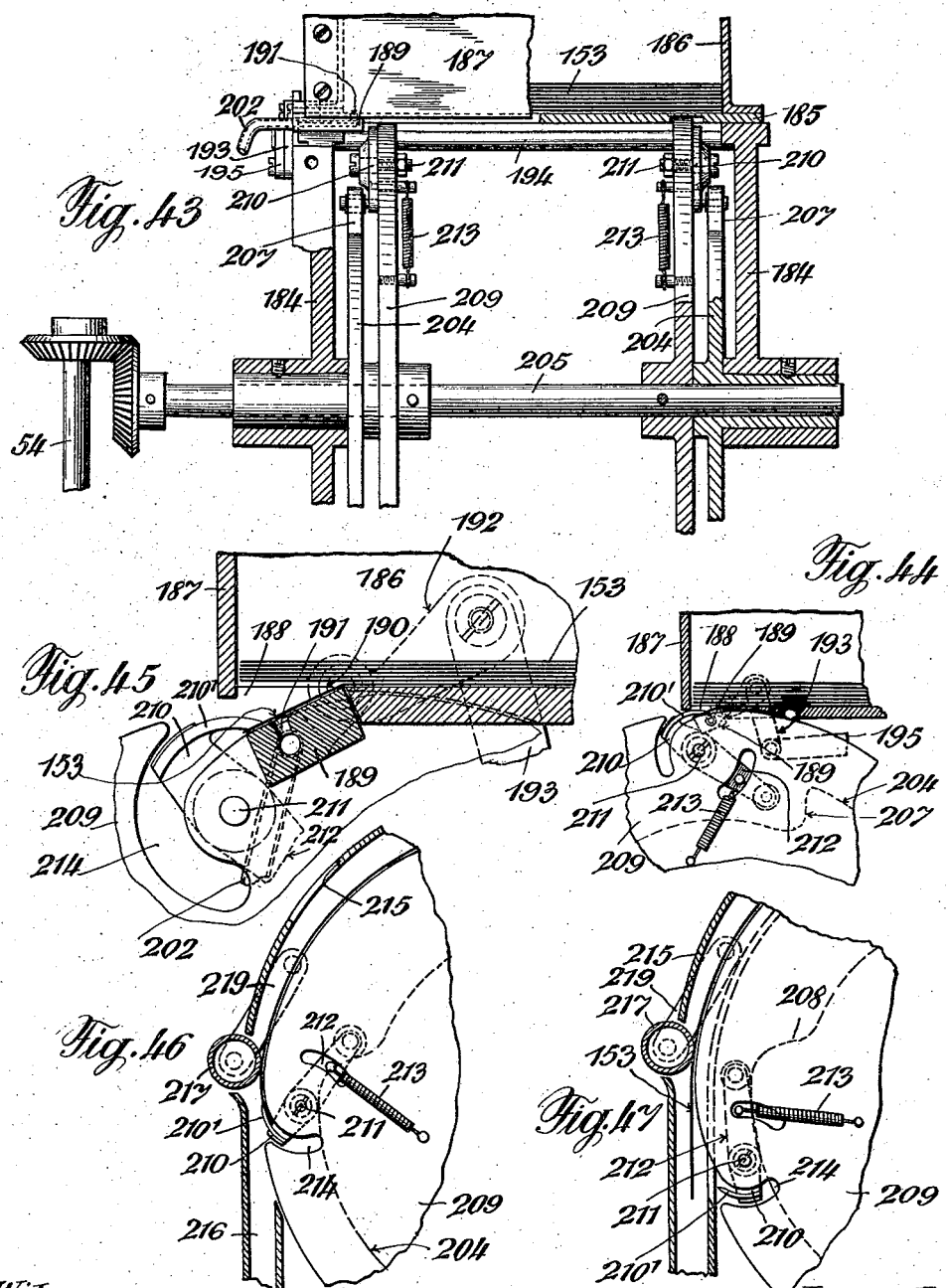

UNITED STATES PATENT OFFICE.

JEAN DE BLONAY, OF LAUSANNE, SWITZERLAND, ASSIGNOR TO THE FIRM OF SAPAL SOCIETE ANONYME DES PLIEUSES AUTOMATIQUES, OF LAUSANNE, SWITZERLAND.

PACKING AND WRAPPING MACHINE.

1,136,412.  Specification of Letters Patent.  Patented Apr. 20, 1915.

Application filed September 2, 1913. Serial No. 787,670.

*To all whom it may concern:*

Be it known that I, JEAN DE BLONAY, a citizen of the Republic of Switzerland, residing at Lausanne, Switzerland, have invented new and useful Improvements in Packing and Wrapping Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a machine for piling circular, disk like bodies and for wrapping up these piles of disks in at least one envelop. In machines of this kind a number of disks are piled up in a receptacle and the pile is then fed in a wrapping device, in which an envelop is wrapped around the pile by means of rollers, while the parts of the envelop projecting beyond the front end of the pile are folded over the latter. These machines are particularly adapted for packing rolls of chocolate disks, the pile of disks being provided at first at each of its ends with a closing disk and afterward wrapped up in an inner and in an outer envelop (label) projecting beyond said closing disks, the outer envelop or label being also fastened by means of gluten to the roll and to the closing disks.

A convenient mode of carrying this invention into effect is shown by way of example in the accompanying drawings, in which—

Figure 1 is an elevation of the machine seen from the side of the wrapping device, a part of the driving mechanism being shown in section, Fig. 2 is an elevation of the machine seen from the side of the feed mechanism for the envelops, showing a part of the driving mechanism in front view, Fig. 3 shows a vertical section of the machine and Fig. 4 shows a plan view thereof; Fig. 5 shows a horizontal section on the line I—I of Fig. 1; Figs. 6-8 show horizontal sections on the lines II—II, III—III and IV—IV, respectively of Fig. 3, Fig. 6 being drawn on an enlarged scale, Fig. 9 is an elevation of the machine seen from the side of the device for feeding the chocolate disks and for piling up the latter, this figure being drawn on a smaller scale than Figs. 1-3, Fig. 10 shows a longitudinal section of this device on the line V—V of Fig. 9, Fig. 11 shows a longitudinal section of this device on the line VI—VI of Fig. 10; Figs. 12 and 13 show parts of the device for piling the disks and Figs. 14-16 several succeeding stages of the piling up operation; Figs. 17-18 show in a vertical and horizontal section means for providing the pile of disks with closing disks, Fig. 19 shows on an enlarged scale a vertical section of the wrapping device, Fig. 20 is a horizontal section on the line VII—VII of Fig. 19, Figs. 21-28 show parts of the wrapping device, Fig. 25 being a section on the line VIII—VIII of Fig. 24. Figs. 29 and 30 show in a longitudinal section two succeeding stages of the wrapping up operation, Fig. 31 shows the two unfolded envelops in their respective positions, Fig. 32 shows a view of the wrapped up chocolate roll and Fig. 33 a section of this roll, drawn on an enlarged scale, Figs. 34-36 show a plan view of the adjustable conveying or feed rollers for the inner and outer envelops and of the mechanism operating these rollers, Figs. 37-40 show vertical and horizontal sections of parts of the device for conveying or feeding the piles of disks to the wrapping device, Fig. 41 shows a side view of the feed device for the outer envelops (labels), Fig. 42 is a plan view of this device and Fig. 43 a front view thereof, partly in section, Figs. 44-47 show parts of this device in different working positions and Fig. 48 shows the scissors for cutting the inner wrappers or envelops from a band or strip.

The machine illustrated in the accompanying drawings is provided with a feed device for the chocolate disks and a device for piling these disks; it is further provided with means for providing the piles of disks at their two ends with closing disks of cardboard. The machine is also provided with means for conveying the piles of disks to the wrapping device, for bringing these disks into the latter and for pushing the wrapped up chocolate rolls out of the wrapping device and for carrying off these rolls. The machine possesses further a wrapping device for wrapping up the pile of disks into an inner and an outer envelop, said device being provided with feed means for these envelops. These latter means consist of a feed device for the inner envelops of cardboard, this device being provided with scissors for cutting the strips from a band, and of a feed device for the outer envelops consisting of thin paper sheets (labels), the latter device being also provided with means for applying the gluten and with an air pump. All these devices are arranged on a common casing forming the machine frame 1. The upper end of this frame is closed by a horizontal, fixed plate 2 and the frame is also provided with a side door 3, which permits an inspection of those parts of the driving device which are arranged inside the frame. This device actuates all the movable parts of the machine in such a manner that all working operations are performed automatically. In the following description the aforementioned devices are now separately described.

1. *The driving device*, (Figs. 1–8.)—This device consists of an electric motor 4 arranged inside the frame 1, connected by means of a rope drive 5, 6, 7 to a countershaft 8 arranged at the outside of the frame 1. The shaft 8 is connected by means of a rope drive 9, 10, 11 to a worm 12 (Figs. 1, 2). This worm engages a worm wheel 13 mounted on a vertical shaft 14 supported in the frame 1. The worm 12 and the worm wheel 13 are arranged in a closed casing 15. The shaft 14 drives by means of two toothed wheels 16, 17 a shaft 18 carrying a cam drum 19, provided at its circumference with a number of lifting cams. A lifting cam 20 actuates the scissors, a lifting cam 21 actuates the device for introducing a pile of disks into the wrapping device and for pushing the finished chocolate rolls out of this device, a further lifting cam 22 actuates the air pump of the feed device for the labels, while a lifting cam 23 actuates the device for piling up the chocolate disks. (Fig. 3).

On the shaft 18 is mounted a toothed wheel 24, provided on its circumference with a toothless part and on the top of the latter with a locking member 25. (Fig. 8). The wheel 24 engages a toothed wheel 26 carrying a ring 27, provided with a recess 28 corresponding to the locking member 25 attached to the wheel 24. The toothed wheel 26 is fixed to a sleeve 31 (Fig. 8) on which are also mounted a toothed wheel 29 and a chain-wheel 30 (Fig. 3), said sleeve 31 being loosely mounted onto the shaft 14. The chain wheel 30 transmits the drive to the feed rolls of the hereinafter described feed device for the inner envelops or cardboard-strips (Fig. 6). The parts 25 and 28 form together a feed device, which permits to impart such an intermittent movement to the wheels 29 and 32, and therefore also to the shaft 33 and the toothed wheel 37, that the parts 29, 32, 33 and 37 are rotated as soon as the wheels 24 and 26 are brought into gear, while said parts remain stationary when the parts 25 and 28 are brought into engagement.

The intermittingly rotating shaft 33 actuates the device for feeding the chocolate disks and for piling up the latter and also the wrapping rolls of the wrapping device. To effect this, there is provided a chain wheel 34 fixed to the shaft 33, said wheel 34 being connected by means of a chain 35 to a chain wheel 36, loosely mounted onto the shaft 18 and connected to a toothed wheel 37 (Fig. 3).

The continually rotating shaft 18 carries a wheel 38 provided with teeth 39 (Fig. 6). This wheel carries a ring 40 having a recess 41. The ring 40 works together with a ring 43 provided with a number of recesses 42 and attached to a toothed wheel 44, which may gear with the teeth of the wheel 38. The wheel 44 is connected by means of a sleeve 45 (Fig. 7) to a toothed wheel 46; this sleeve with the two toothed wheels being loosely mounted onto the shaft 14. The toothed wheel 46 gears with a pinion 47 carried by the plate 2 and the pinion 47 gears with a toothed wheel 48, connected with the table 49 arranged above the plate 2. The wheel 48 is fixed to the hub of the table 49, the hub being loosely mounted onto the shaft 18 and being supported in the plate 2. (Figs. 3 and 7). The toothed wheel 46 also gears with a pinion 50 fixed to a vertical shaft 51 arranged in the frame 1. The shaft carries also a pinion 52 gearing with a toothed wheel 53, which is mounted on the vertical shaft 54 driving the feed device for the labels (Fig. 2). The pinion 52 is connected to a chain wheel 55 actuating the device for applying the adhesive substance or gluten (Figs. 2, 6 and 7).

The wheels 38 and 44 form together with the locking parts 40 and 43 a feed device which imparts an intermittent rotary movement to the table 49 and the wheels 51 and 54, the wheels 44 and 46 remaining stationary, when the ring 40 enters in a recess 42 provided on the ring 43, while the wheels 44 and 46 are rotated through a certain angle, when the teeth 39 on the wheel 38 gear with the wheel 44, the table 49 describing each time a quarter of a revolution.

2. *The device for feeding the separate chocolate disks into the machine and for piling up these disks*, (Figs. 1–4 and 9–16.)—The intermittingly rotating shaft 33 guided in the frame 1 and the plate 2 is connected by means of bevel wheels to a horizontal shaft 56, carried by brackets 57 connected to the plate 2. (Figs. 10 and 11). The shaft 56 actuates by means of a chain-wheel gearing 58 a screw pinion 59 gearing with a screw wheel 60, said pinion 59 being loosely mounted on a shaft 61 parallel to the shaft 56 and supported by the brackets 57. (Fig. 11). To the screw wheel 60 is connected a roll 62, over which runs an endless conveying band 63 passing also over a second roll 64, which is carried by a bracket 65 of the machine frame (Fig. 9). On the same level with the upper horizontal part of the band 63 and laterally of the latter there is provided a fixed table 66 and along said band there are arranged lateral guide rails 67, the one of which is provided with a bent portion 68 extending across the band and acting as a stop. (Figs. 4 and 10).

The table 66 is used to take up the round chocolate disks $s$, which have to be piled up. One side of these disks is greater than the opposite one. These disks $s$ are taken by hand from the table and then placed upon the band 63, the side having the smaller diameter lying underneath (Figs. 4 and 9). The band 63 carries the disks $s$ lying one behind another within reach of a conveying wheel 69, provided with four conveying arms 70 and fixed on a shaft 56. (Figs. 10 and 11).

The wheel 69, 70 engages a pivotally mounted holder 71 (Figs. 11 and 13) carried by the shaft 61 and provided with a rectangular slot 72 adapted to take up a single chocolate disk. The shaft 61, and therefore also the holder 71, are moved intermittingly by the shaft 56. To impart such a movement to these parts 61 and 71 there is provided a disk 73 having at its circumference two sets of teeth, arranged diagonally one opposite another (Fig. 12). These sets of teeth gear alternately during the rotation of the disk 73 with a pinion 75 (Figs. 11 and 12) mounted on the shaft 61, imparting thereby an intermittent motion to said pinion 75 and the shaft 61. The toothed parts 74 of the disk 73 have such a length, that just half a revolution is imparted to the pinion 71, and therefore also to the shaft 61, when said parts 74 engage the pinion 73. The holder 71 is brought into a horizontal position during each pause of the shaft 61, the lower wall of the opening 72 being then in the same horizontal plane, i. e. on a level with the upper half of the conveying band 63. Figs. 10 and 14–16.) To lock the shaft 61, and the holder 71, when they remain stationary, there are provided on the disk 73 two segment-shaped locking members 76 (Fig. 12) engaging oppositely arranged recesses 77 of a pinion 75 connected to the disk 78 and working in such a manner together with said recesses, that the shaft 61 is not moved as long as the locking members run in the recesses 77. Below the holder 71 there is provided a stationary trough-like bent guide-plate 79 (Figs. 10 and 11) preventing the chocolate disks in the holder 71 from falling out during the rotation of this holder 71.

In the table 49 there are arranged four vertical cylindrical receptacles 80 (Figs. 4 and 9) placed toward one another at an angle of 90° and adapted to receive the chocolate disks, respectively the finished chocolate rolls. These receptacles are open at their lower and upper ends. (Fig. 3). In the plate 2 of the frame 1 there is further guided a vertical rod 81 carrying at its upper end a plate 82, which forms alternately the bottom of the four receptacles 80, when they are filled with chocolate disks. This rod 81 is connected by means of a rod 83 to a lever 84 (Fig. 3) pivotally mounted in the frame 1 (Fig. 5) and carrying a roller running in a cam groove 23 of the cam drum 19. The rod 81 passes during the pause of the intermittingly rotating table 49 through the latter and it enters into the receptacle 80 situated immediately above it and it reaches in the latter its uppermost position shown in Fig. 3, whereupon it falls again gradually downward in accordance with the shape of the cam groove 23.

For each receptacle 80 there is provided beneath the table 49 a pair of levers 85, 86 (Fig. 4) having several arms. The arms of these levers arranged below the receptacles 80 are provided with supporting jaws and they are operatively connected to other arms, a third arm $85^1$ of the lever 85 being acted upon by a spring, which presses said arm against a disk 88 provided at its circumference with recesses 87. As hereinafter described, the levers 85, 86 are actuated in such a manner by said disk 88 that they are opened before the rod 81 enters in the receptacle 80 situated above this rod 81 in order to permit the latter, to pass between the above mentioned carrying jaws, while they are closed as soon as the rod 81 leaves the receptacle 80, whereby the jaws replace the plate 82. To the two supports 57 are further attached by means of screws two receptacles 89, each containing a pile of round disks $k$ of cardboard (Figs. 4 and 17.) Each of these receptacles has a slotted bottom 90 and an outlet passage 91 for said disks of cardboard. (Figs. 17 and 18.) Each of said receptacles 80 is also provided at its upper end with a projecting nose 92, which pushes the lowermost cardboard-disks out of the receptacle 89.

When a receptacle 80 passes below a receptacle 89 and previously to reaching the position, in which it is opposite the holder 71, it pushes by means of the nose 92 a disk $k$ out of said receptacle 89, the disk $k$ falling then into the receptacle 80; as soon as the table and the receptacle 80 filled with chocolate disks are turned through an angle of 90°, said receptacle 80 pushes also a disk out of the second receptacle 89, when it passes below the latter. This disk falls on the uppermost chocolate disk of the pile, so that there comes to lie a disk $k$ above and below each pile of chocolate disks. These disks $k$ impart to the pile greater rigidity.

If there has to be taken a cardboard disk $k$ out of the receptacle 89, the nose 92 provided on the receptacle 80 projects through the slot into the bottom 90 pushing thereby the lowermost disk $k$ through the opening 91 out of said receptacle 89.

The wheel 29, and shaft 33 transmit an intermittent rotary motion to the shaft 56 and therefore also to the conveying wheel 69, 70. This is effected in such a manner, that the conveying wheel describes three revolutions during the time that the wheel 29 gearing with the wheel 24 (Fig. 8) makes one revolution, the wheel 69, 70 being then brought to a stand still after each three revolutions. While the conveying wheel is rotated three times, its four arms 70 introduce twelve chocolate disks into the receptacle 80 situated in front of the holder 71, the chocolate disks being alternately turned through an angle of 180° by the intermittingly rotated holder 71 before they fall into said receptacle 80. These proceedings take place in the following manner.

At the beginning of the filling of a receptacle 80 with chocolate disks $s$, the rod 81 carrying the plate 82 is in its uppermost position (Fig. 3) and the plate 82 carries a cardboard-disk $k$. The parts of the device capable of rotating rotate in the direction of the arrows shown in Figs. 10–16. It is now assumed, that the conveying wheel 69, 70 has already pushed a disk $s$ into the receptacle 80 and that a second disk $s$ is taken up by the stationary holder 71, while a third disk $s$ carried by the band 63 is in front of the stop 66. The first disk is now turned before its introduction into the receptacle 80, since a toothed part 74 of the wheel 73 engages the pinion 75 so that the shaft 61 and the holder 71 are turned through an angle of 180°. The smaller side of said disk lies therefore upward in the holder 71 (Fig. 15) and it is then pushed in this position into the receptacle 80, as soon as the second disk is introduced from the conveying band 63 into the holder 71. The lower larger side of the first disk introduced into the receptacle 80 lies upon the cardboard-disk $k$ carried by the plate 82 (Fig. 10).

As the holder 71 remains now stationary for a certain time, since one of the locking members 76 engages a recess 77 provided in the disk 78 of the pinion 75, while the wheel 69, 70 is continually rotated, it is evident, that the second disk pushed into the holder 71 will not be turned therein, but remains in the position, that it had upon the conveying band 63 (see Fig. 10). This second disk is then pushed into the receptacle 80 as soon as a third disk $s$ is conveyed by the wheel 69, 70 to the holder 71 (this second disk is shown in Fig. 10 in dotted lines). The smaller side of the second disk pushed into the receptacle 80 is then brought into contact with the corresponding smaller side of the previously introduced first disk. The third disk $s$ taken up by the holder 71 is again turned owing to a turning movement imparted to this holder and it is then pushed into the receptacle 80 as soon as a fourth disk is introduced into the holder 71 (see position shown in Fig. 15 in dotted lines), the larger side of this third disk coming then in contact with the upwardly lying larger side of the second disk $s$. (Fig. 16). The holder 71 is now brought to a standstill and the fourth disk $s$ taken up by the holder 71 is pushed by means of the wheel 69, 70 in the same position, that it had upon the conveying band 63, into the receptacle 80 as soon as a fifth disk is introduced into said holder (Fig. 16). The smaller side of this fourth disk pushed into the receptacle comes to lie adjacent the smaller upwardly lying side of the third disk. The above described operations are repeated till the receptacle is filled with twelve chocolate disks, which lie alternately with the one and the other of their corresponding sides of the same diameter one upon another.

While the receptacle 80 is gradually filled with disks, the cam groove 23 acts in such a manner upon the rod 81, that the latter is gradually lowered and is drawn finally out of said receptacle, the levers 85, 86 arranged below said receptacle being then closed, so that the lower disk of cardboard $k$ and the pile of disks arranged above the latter are now supported by the two levers 85, 86. The table 49 is now again rotated through an angle of 90°, a cardboard-disk being taken out of the second receptacle 89 during this movement and put upon the pile of disks. At the same time a new receptacle 80 is placed opposite the holder 71, said receptacle, after having taken up a disk of cardboard $k$, being also filled in the hereinbefore described manner with chocolate disks $s$.

3. *The device for bringing the piles of disks within each wrapping device and for conveying the finished chocolate rolls out of the wrapping device*, (Figs. 1–4, 6, 7.)—This device consists of the hereinbefore described table 49 provided with receptacles 80 and levers 85, 86 and intermittingly rotated through an angle of 90° by the shaft 18, and feed wheel 38, and of the aforementioned disk 88 actuating the levers 85, 86. This disk 88 is loosely mounted onto the hub of the table 49 and it is capable of rotating through a small angle. For this purpose there is provided in said disk 88 a slot 93, into which projects a pin 94 provided on the plate 2, the disk 88 being pressed by a tension-spring 95 against said pin 94. (Fig. 4) The disk 88 is connected with an arm 96, which is intermittently acted upon by a second arm 97 fixed to the shaft 14, so that a rotary motion is imparted to said disk. As already stated, several recesses 87 are provided on the circumference of said disk 88. In the present instance there are provided three of such recesses 87 separated one from another by an arc of 90° (Fig. 4) and engaged by the arms 85¹ of the levers 85 opening and closing the carrying jaws of the levers 85, 86. Each of these recesses is provided with a steep part 87 and an inclined lifting part 87¹. 99 denotes a tube leading away the finished chocolate rolls (Fig. 1). This tube is fixed to the plate 2 and it is open at its upper end.

When the table with a receptacle 80 is in front of the holder 71, the arm 85¹ of the corresponding lever pair 85, 86 acted upon by the tension spring 98, falls over the steep part 87 into said recess so that the carrying jaws are rapidly closed, while the rod 81 and the plate 82 carried by the latter are pushed from below into the receptacle 80, in which they form a support for the cardboard-disk $k$ introduced into said receptacle and supported till now by said jaws. (Fig. 3). After the receptacle 80 has been filled with chocolate disks and at the time that the rod 81 with the plate 82 leaves the receptacle, the revolving arm 97 strikes against the arm 96 provided on the disk 88, so that the latter is rotated through an angle, the amount of which depends from the dimensions of the slot 33, in such a direction, that the lever arm 85¹ is rapidly rotated by the inclined lifting part 87¹ of the recess 87. This movement of the disk 88 has the effect to bring the carrying jaws rapidly below the lower cardboard-disk projecting laterally beyond said plate, so that they act as a support for the pile of disks arranged above said cardboard-disk. Immediately afterward and before the arm 85¹ has time to engage, after the releasing of the disk 88 by the arm 97 and the rapid backward movement of the latter the recess 87, the table 49, the levers 85, 86 and the receptacles 80 are turned through an angle of 90°, the arms 85¹ of the lever pairs 85, 86 being then brought in contact with the circumference of the disk 88, so that the carrying jaws of these levers remain in their closed position.

The receptacle 80 containing the pile of disks is now on the right hand side with reference to Fig. 4, near the feed device for the labels and it remains there till the following receptacle is filled with chocolate disks, without the corresponding levers 85, 86 being operated. The following intermittent movement of the table 49 carries the pile of disks within reach of the wrapping device, i. e. of the members for pushing the pile between the wrapping rolls. The arm 85¹ of the lever pair 85, 86 falls hereby into the recess 87 of the disk 88, so that the carrying jaws are opened to permit to said pushing members for feeding the pile to the wrapping rolls to seize the pile. The table remains then stationary and the carrying jaws remain open till the pile of disks is wrapped up and till the wrapped up chocolate roll is conveyed from the wrapping rolls into the receptacle 80. The carrying jaws of the levers 85, 86 are then again closed by the arm 97 acted upon by the revolving disk 88, as it is the case after the filling of the receptacle with chocolate disks, so that the finished chocolate roll is supported by said jaws. The table is hereafter again rotated through an angle of 90°, so that the receptacle is now above the discharge pipe 99. If the arm 85¹ of the lever pair 85, 86 falls now into the recess provided on the disk 88, the carrying jaws are opened, so that the chocolate disk may fall from the receptacle 80 into the pipe 99 which conveys it into another receptacle.

*4. The device for feeding the pile of disks into the wrapping device and for pushing the finished chocolate rolls out of this device,* (Figs. 1–5 and 29.)—This device has two shafts 100 and 101 movable in a vertical direction and arranged one upon another in the same vertical axis. The lower shaft 100 forms a rack and it is guided in a fixed part 102 of the frame 1 as well as in a part 103 of the lower casing of the wrapping device (Fig. 19). This rod is moved to and fro by means of a cam drum 19. For this purpose there is movably arranged in a vertical guide member 104 of the frame 1 a slide 105, which is provided at one end with a toothed formation and a roll projecting into the cam groove 21 of the cam drum 19 (Figs. 3, 5 and 40). The toothed formation of the slide is engaged by a pinion 106, which is mounted on a shaft, supported in the fixed part 102 and carrying a toothed wheel 107 gearing with the rack 100 (Figs. 3, 5 and 40.) While the cam drum 19 is once rotated, the slide is moved once to and fro and the rod 100 is moved at the same time once up and down by means of the toothed wheels 106 and 107. In the upper end of the rod 100 is adjustably arranged a pin 108, acted upon by a spring 109, which tends to move the pin outward into the position shown in Fig. 19. A stop not shown prevents this pin to move beyond this position.

The upper pushing rod 101 is loosely guided in a sleeve 110 attached to the two casings of the wrapping device (Figs. 1, 4 and 29), and it carries a collar 111, limiting its downward movement (Fig. 29). In the rod 101 there is also guided a pin 112, provided near its lower end with a groove 113, which may be engaged by a resilient bolt 114 supported by the sleeve 110 and locking then said pin in its uppermost position. The bolt 114 projects through a slot 115 provided in the rod 101 and it is provided with a tapered head 116 acted upon by a tapered shaft 117, which is capable of being adjusted vertically in the sleeve 110 to displace the bolt 114. The shaft 117 projects beyond the lower end of the sleeve 110. (Figs. 29 and 39). The pin 112 carries at its lower end a disk-like member 118, while the rod 101 carries an annular flange 119 (Fig. 29).

After that a finished chocolate roll has been pushed out of the wrapping device, the two rods 100 and 101 are in their end positions; the upper end of the shaft 100 with the pin 108 is below the table 49, while the lower end of the rod 101 is with the pin 112 above the upper edge of the receptacle 80, into which has been pushed said chocolate roll. The pin 112 is now held in its proper position by the bolt 114 engaging the groove 113 and the rod 101 is supported by the member 118 of the pin 112 (Fig. 37), so that the table 49 is capable of rotating and of conveying a new receptacle 80 containing a pile of disks between the rods 100 and 101.

The lower rod 100 is now moved upward, the pile of disks contained in the receptacle being also moved in the same direction, so that it imparts a short upward movement to the rod 101. Owing to this movement of the rod 101 the tapered shaft 117 is pushed by the flange 119, so that it acts upon the head 116 of the bolt 114, moving the latter backward and releasing thereby the pin 112. This pin 112 and the rod 101 are now only acted upon by their own weight and they are supported by the pile of disks. (Fig. 38.) The weight of the two parts 101 and 112 presses now the pin 108 of the lower rod 100 into the rod 101 (Fig. 3). As soon as this lower rod 100 is moved downward, the pile of disks acted upon by the released parts 101, 112 is also moved in the same direction and pushed between the wrapping rolls of the wrapping device. The tapered rod 117 falls again downward and releases the bolt 114, which is again pressed against the pin 112. The ring 111 strikes now against the sleeve 110, so that the rod 101, but not the pin 112, is prevented from moving farther downward. As soon as the rod 101 is kept back and its weight taken off the pile of disks, the pin 108 acted upon by its spring 109 is moved during the downward movement of the rod 100 the same amount out of this rod 100 as the pin 112 is moved out of the rod 101, so that the parts 100, 108 and 101, 112 are in the position shown in Fig. 29, when the rod 100 remains stationary, and they remain in this position till the pile of disks is wrapped up.

After that the wrapping up operation is completed, the cam drum 19, respectively its cam groove 21, lifts again the lower rod 100 as well as the finished chocolate roll and the parts 101, 112, the pins 108 and 112 being then moved into their rods, so that the chocolate roll is held between the shafts or rods 100 and 101. As soon as the roll reaches the receptacle 80, the bolt 114 engages again the groove 113 of the pin 112, so that the latter and the rod 101 are locked in their uppermost position, while the rod 100 is moved below the table. Thereupon the working cycle hereinbefore described is repeated.

5. *The device for wrapping up the pile of disks in an inner and outer envelop.* (Figs. 1–4, 6 and 19–30.)—This device possesses as already stated, two casings having the same vertical axis arranged one above another and of substantially cylindrical shape. 121 denotes the upper casing and 120 the lower one. These casings consist of two parts and they are attached to vertical plates 122 and 123, which are in staggered relation one to another and fixed to the frame 1. (Figs. 1, 6 and 20.) The casing 121 is capable of being adjusted in the axial direction as regards the casing 120. Between the two casings 120 and 121 there are provided a plurality of vertical wrapping rolls 124 (Fig. 3) forming a complete ring concentric to the axis of the two casings 120 and 121. The axis of said rolls are supported in the casings 120 and 121 and they are positively connected one to another. The rolls 124 are alternately of different length (Fig. 3) and they are provided with members 125 adjustable in the longitudinal direction and being also of different length (Figs. 29 and 30), the rollers and said members 125 having a rubber cover. (Fig. 19.) Each member 125 carries a small pin $125^1$ which is pressed by the rubber cover into a notch $124^1$ of the axis of the corresponding roller 124 (Fig. 27). Each roller axis is provided with a plurality of such notches arranged one beside another and permitting to adjust the roller parts 125 into a number of different positions as regards the rollers 124. Owing to this adjustable arrangement of the roller parts 125 and of the casing 121, it is possible to alter the operative length of the wrapping rollers, so that the machine is adapted to wrap up piles of chocolate disks of different height.

The axes of the rollers 124 are guided in inclined slots 126 (Fig. 22) of pivotally arranged disks 127 and $127^1$ mounted in a concentric manner in the casings 120 and 121. Each pair of these axes is connected at both ends by means of rods 128 to a fixed pin 129 (Figs. 19 and 21), two and two of these rods being fixed to the same pin 129. The pins 129 are screwed into sleeves 130 and $130^1$ (Fig. 19), the latter being mounted concentrically in the casings 120 and 121 and being prevented from turning. The wrapping rollers are positively driven by toothed wheels; to effect this there are loosely mounted upon the pins 129 of the sleeves 130¹ small toothed wheels 131. These wheels 131 gear with a toothed wheel 132 loosely mounted on the hereinbefore mentioned concentric guide piece 103 of the casing 120 as well as with small toothed wheels 133 fixed to the roller ends projecting into the casing 120 (Figs. 19, 26 and 28). One of the toothed wheels 131 gears with a toothed wheel 134 carrying a smaller toothed wheel 135 and mounted on a vertical shaft 136 supported by the casing 120. The toothed wheel 135 gears with the beforementioned toothed wheel 37, which receives its motion from the shaft 33 and which actuates intermittingly the wrapping rollers. (Figs. 3, 19 and 26.) In the sides of the two sleeves 130 and 130¹ facing one another there are provided radial guides 137, in which are guided folding members 138 (Figs. 24 and 25). These folding members are capable of being simultaneously moved in the guides 137 inward or outward. For this reason each of said members 138 carries a pin 139 and between the sleeves 130 and 130¹ and the casing 121, respectively the casing 120 there are pivotally mounted rings 140 and 140¹, respectively, (Figs. 19 and 20). Each of these rings 140, 140¹ is provided with a flange projecting beyond the inner side of the sleeve 130 and 130¹, respectively, and having inclined slots 141 (Fig. 20), into which project the pins 139 of the folding members 138 (Fig. 19). The disks 127 and 127¹, which permit the adjustment of the rollers 124 axially by means of the slots 126, are provided with arms 142 and 142¹ respectively, (Figs. 3, 9 and 20) connected together by means of a pin 143. This pin carries a roll, while a tension spring 144 (Fig. 20) presses said roll with the pin against a cam disk 145 attached to the feed wheel 38 (Figs. 3 and 6). The rings 140 and 140¹ permitting a radial adjustment of the folding members 138 by means of the slots 141 are connected together by means of a pin 146 (Figs. 3, 6 and 20). The lower ring 140¹ carries a toothed segment 147, engaged by a second segment 148 pivotally mounted on the axis 136 and connected to an arm 149, which lies with a roller within reach of a cam disk 150 rotating with the wheel 38 (Figs. 6, 19 and 20). A tension spring 151 (Fig. 20) has the tendency to rotate the two rings 140 and 140¹ in such a manner, that the folding members 138 are brought into their outer positions (Fig. 6, upper half). 151¹ denotes a cover provided on the upper casing 121 (Fig. 19).

The cam disks 145 and 150 transmit alternately an intermittent rotary motion in the one and the other direction to the disks 147, 147¹ and the rings 140, 140¹. If the disks and the rings are rotated owing to the action of the cam disks 145 and 150 upon the pin 143 and the arm 149 in the direction of the arrows shown in Figs. 20 and 22, the rollers 124 are moved radially outward (Fig. 23) while the folding members 138 are moved inward (see lower half of Fig. 24 and Fig. 30). As soon as the disks and the rings are, however, rotated in the opposite direction, owing to the action of the tension springs 144 and 151, the rollers 124 are moved inward (Fig. 22) and the folding members 138 outward (see upper half of Fig. 24). The small toothed wheels 133 of the rollers engage during the adjustment of the latter the stationary toothed wheels 131; this is effected by the connecting rods 128. The casing 121 and the parts 127, 130 and 131 mounted therein, are provided with central passages sufficiently great to permit the passing therethrough of the pile of disks to be wrapped up and of the finished chocolate roll, respectively.

The piled up round chocolate disks s placed between two cardboard disks k are wrapped, as already stated, in an inner envelop 152 of cardboard. This envelop of cardboard 152 forms together with the closing disks k a case or box, which is afterward wrapped up in an envelop 153 of thin paper forming the proper wrapping cover. (Fig. 33.) The width of the envelop 153 is usually greater than that of the envelop 152 (Fig. 31), so that the edges of the envelop projecting beyond the disks k are folded down against the ends of the pile, for the purpose of being glutened to the disks k and the envelop of cardboard (Fig. 32). The two vertically arranged envelops 152 and 153 are fed in a horizontal direction from opposite sides toward the wrapping rollers 124 (Figs. 1 and 6). To effect this, there are provided pairs of feed rollers, which are described later on. These rollers are supported by plates 122 and 123 and they push said envelops lying upon these plates toward the wrapping rollers 124, the arrangement being such, that one roller of each of these pairs is capable of being lifted off the corresponding second roller of said pairs. The envelop of cardboard is cut from a coiled band, while the paper envelops 153 having the proper length are taken out of a magazine. As soon as this envelop 153 has been taken out of the magazine there is applied an adhesive substance to three of its sides.

The wrapping device works as follows together with the hereinbefore described pushing in and out device: Before the rods 100 and 101 and the pile of disks gripped by the latter are vertically moved downward, the wrapping rolls 124, 125 are radially moved one from the other (Fig. 23). The pile of disks is thereupon pushed between these rollers and the wrapping rollers are hereafter again moved radially inward, (Figs. 20 and 22) and rotated in the direction of the arrows shown in Figs. 20 and 26 while the wrapping operation is proceeding. After the cardboard envelop 152 is fed between the wrapping rollers, a paper envelop is also introduced at a distance a (Figs. 31 and 33) between said rollers. All wrapping rollers exert gradually an equal pull upon the two envelops and they wrap the latter round the rotating pile of disks, the envelops 152 and 153 overlapping one another to the amount b and c, respectively, (Fig. 33) the overlapping parts of the envelop 153 being pasted to the ends of the roll.

The pile of disks and the envelops are now in the position shown in Fig. 29, in which said pile is only held in its proper position by the pins 108 and 112 projecting to a certain amount out of the rods 100 and 101; this amount is a little greater than that by which the outer envelop 153 projects beyond the upper and lower edges of the inner envelop. This permits the provision of sufficient space for the folding members 138, which are now moved inward by means of the rings 140 and 140¹ rotated in the proper direction for causing such a movement of said members. While the pile of disks and its envelops are further rotated, the edges of the paper envelop 153 projecting beyond the ends of the pile, respectively beyond the disks k of cardboard, are bent inward, i. e. they are folded upon the disk k, being then pasted to the latter (Fig. 30). By this time the folding members 138 and the wrapping rollers 124, 125 are moved outward, stopped and the finished chocolate rolls are introduced by means of the rods 100 and 101, pushing said rolls upward and out of the rollers 124, 125, into the receptacle arranged above the wrapping device. The finished chocolate roll has the shape shown in Fig. 32. The hereinbefore described working cycle is now repeated.

6. *The feed mechanism for the inner envelops (cardboard-strips) and the scissors for cutting these strips*, (Figs. 1, 4, 5, 9, 36 and 48.)—The cardboard-strips are cut from a band, which is coiled upon an axis 154. This vertical shaft arranged below the table 66 is pivotally supported by the arm 65 of the machine frame 1 and it carries a belt roller 155 (Fig. 9), which is connected by means of a belt 156 to an axis 157 also vertically supported in the machine frame 1 (Figs. 1 and 4). On this axis 157 is mounted a roll 158. working together with an intermediate roll 159 to guide the band of cardboard passing between the two rolls 158 and 159 (Figs. 1, 4 and 6). The two rolls are connected by means of toothed wheels 160 one to another and to a chain-wheel 161 (Fig. 1), which is connected by means of a chain 162 to the hereinbefore mentioned chain-wheel 30. This wheel 30, and the toothed wheel 29, connected therewith transmits to the two rollers 158 and 159 an intermittent rotary motion in such a direction, that they exert a pull upon the carboard-strip. Near the two rollers 158 and 159 there are arranged the scissors for cutting the cardboard strips 152 from a card-board band. These scissors consist of the blade 163 (Fig. 6) attached to the plate 123 and of the blade 164 pivotally connected to the same plate 123. This blade 164 carries a toothed segment 165, engaging a second toothed segment 166. (Fig. 48.) The latter is connected by means of an axis supported by the frame 1 to a lever 167, which is brought together with a roll within reach of lifting-cam 20 of the cam drum 19 (Fig. 5). To effect this, there is provided a tension spring 168 connected to the segment 166. A pressure arm 169 works together with the scissors 163, 164, said arm 169 being loosely mounted upon the shaft of the scissors blade 164 while a pin 170 of said arm acted upon by a tension spring 171 is pressed from outside against the blade 164 (Fig. 48). This pressure arm holds the carboard-band in its proper position, when the strip is cut off. Between the rollers 158, 159 and the wrapping rollers there are arranged upper and lower guiding rails 172 (Figs. 1, 6 and 48) connected to the plate 123 and guiding the band and the vertically arranged cut off strip in a horizontal direction.

The above described device is further provided with a pair of vertical feed rollers 173, 174 for the cut off strip of cardboard. The inner roller 173 is fixed to the plate 123, while the outer roller 174 is capable of being shifted in inclined slots 175 of bearings 176 (Figs. 1, 6 and 36) fixed to the plate 123; this roller 174 is also pressed by means of a tension spring 177 against the inner roller 173. To adjust the roller 174 there are provided two levers 179 fixed to a vertical shaft 178. The beveled ends of these levers 179 are pressed by means of tension springs 180 against the ends of the axis of the roller 174, so that the latter is lifted off the roller 173 (Fig. 36). The axis 178 carries an arm 181, which is within reach of a segment 165 of the scissors (Figs. 36 and 48). An intermittent rotary motion is transmitted by means of a belt 183 (Figs. 4 and 6) from a rope pulley 182 (Figs. 3 and 19) mounted onto a countershaft 136 to the roller 174.

The card-board-strip is cut off when the rollers 158, 159 remain stationary, the band being then held in its proper position by means of the pressure arm 169; the roller 174 is at this time also disengaged and it remains stationary. When the lifting cam 20 of the drum 19 strikes against the lever 167, the scissors 163, 164 are closed and the strip is cut off and by the time that the scissors are again opened the pressure arm 169 is lifted off the cut off strip by means of the pawl 164 (Fig. 48), while the levers 181 and 179 cause the roller 174 to disengage the segment 165, so that the former is pressed by means of the spring 177 against the roller 173. The roller 174 and the rollers 158, 159 are then rotated, the cut off strip of cardboard 152 is fed between the wrapping rollers and the cardboard-band is fed a certain amount corresponding to the length of the strip 152 through the rollers 158, 159. Hereafter a new strip is cut off.

7. *The feed device for the outer envelops (labels) provided with an air pump and a mechanism for applying the adhesive substance,* (Figs 1, 2, 4–6, 34, 35 and 41–47.)—The outer envelops consist, as already stated, of a thin paper sheet 153. The sheets 153 are piled up and after that they are drawn off separately from said pile they are carried in a vertical position to the wrapping rollers. The pile of sheets is arranged in a magazine consisting of a horizontal plate 185 carrying the pile of sheets and attached to a support 184 which is connected to the frame 1, and of a frame 186, 187 fixed to this plate (Figs. 41 and 42). The plate 185 is arranged a little behind the front wall 187 of the frame, so that there may be provided between these two parts a longitudinal slot 188 through which pass the sheets taken off the pile. The lower end of the front wall 187 of the frame is arranged to a certain extent below the upper surface of the plate 185 (Fig. 45) so that the sheets arranged above the lowermost sheet, which has to be taken off, are prevented from being carried off together with the latter.

On the plate 185 there are provided below two corners of the frame 186, 187 two small suction plates 189, pivotally mounted on fixed pins 190 and provided with a suction opening 191 (Fig. 45) and an arm 192, the latter being connected by means of links 193 to levers 195 mounted unto a shaft 194 carried by the support 184. (Figs. 41 and 42.) The levers 195 and therefore also the suction plates 189 are intermittently oscillated up and downward by means of the cam drum 19, *i. e.* the lifting cam 22 of the latter, the one of the levers 195 mounted on the shaft 194 has an arm 196 which is connected by means of a rod 197 to a lever 198 mounted on a shaft 199, which is supported by the frame 1. The shaft 199 carries a second lever 200, which is in contact with the lifting cam 22 (Fig. 5). The levers 195 are acted upon by tension springs 201 having the tendency to press the suction plates 189 against the pile of sheets (Fig. 41). The suction plates 189, *i. e.* their suction openings 191, are connected by means of suction conduits 202 to the air pump 203 shown in Figs. 1 and 2 and producing a suction action in said conduits 202 and in the openings 191. This air pump is actuated with the help of the parts 198—200 by the lifting cam 22 of the cam disk 19.

To the support 184 are connected the horizontal hubs of two round disks 204, a shaft 205 being supported in said hubs. The shaft 205 is connected by means of beveled wheels (Figs. 2, 3) to the driving shaft 54 (Fig. 43), which receives an intermittent rotary motion from the wheels 38 and 44. The disks 204 are provided on their circumference with notches 206, which terminate at one end in a straight steep slope 207 and at the other end in a curved lifting cam 208. (Figs. 41, 44 and 47.) Between these two disks 204 there are mounted on the shaft 205 two round disks 209, each of which is provided near its circumference with a lateral gripper 210 (Fig. 43). These grippers rotate together with the disk 209 and they are pivoted on pins 211 fixed to these disks. Each gripper carries an arm 212 provided with a roll and these rolls are pressed by means of a tension spring 213 against the circumference of the corresponding fixed disk 204 (Fig. 41). Each disk 209 is further provided at its circumference with a curved slot 214 (Figs. 44 and 45) adapted to take up the gripping jaw $210^1$ of the gripper 210.

To the front side of the support 184 is fixed a guide provided with a curved upper part 215 and an adjacent vertical cover part 216 closed at its lower end (Figs. 1, 2, 41 and 46). This guide extends over a part of the circumference of the two disks 209 (Figs. 41 and 42) and its width is a little greater than the width of the sheets of the pile. Between the two guide parts 215 and 216 there is provided a horizontal slot, into which projects a pressure roll 217 acted upon by springs 218 pressing said roll against the circumference of the two disks 209 and connected to levers 219, which carry the roll 217 and which are connected to a guide piece 215.

The hereinbefore described device is also provided with a mechanism for applying the adhesive substance to the outer envelop. This mechanism provides in particular the two longitudinal edges and a lateral edge of the outer envelops 153 with gluten (as shown in dotted lines in Fig. 31) and it consists of a vertical receptacle 220 for the gluten. This receptacle is fixed to the frame 1 and it is provided at its rear side, which is in contact with the guide 216 with a longitudinal slot 221 (Fig. 1), into which projects a cylinder 222 (Fig. 6) for applying the gluten to the envelop and mounted eccentrically in the receptacle 220. This cylinder carries at its circumference a number of ledges for applying the gluten, the developed ground shape of these ledges being shown in dotted lines in Fig. 31. The cylinder 222 receives an intermittent rotary motion from the shaft 51, there being provided for this purpose the previously mentioned chain-wheel 55 mounted onto the shaft 51, said wheel 55 being connected by means of a chain 224 passing over guide rolls 223 to a chain wheel 225 mounted onto the shaft of this cylinder (Fig. 6).

The cylinder 222 works together with a pressure and feed roller 226 vertically mounted in oscillating arms 227 mounted onto a shaft 229 acted upon by a torsion spring 228 (Fig. 1). The shaft 229 is vertically supported by the plate 122. The spring 228 has the tendency to press the roller 226 against the cylinder 222. The roller 226 is positively connected to the cylinder 222 by means of toothed wheels $229^1$ (Figs. 1 and 6) and it is moved at times away from the cylinder, without coming, however, out of gear with said cylinder. To effect this, there is provided at the upper end of the axis of the cylinder 222 a cam disk 230 acting upon the upper of the two levers 227, which is moved by this lever against the action of the spring 228 in such a manner that the pressure roll is moved away from the cylinder 222. (Fig. 34.)

Between the receptacle 220 and the wrapping device there are provided horizontal guides 231, for the labels 153, said guides extending from one of said parts to the other and being fixed to a plate 122. (Figs. 1 and 6.) Near the wrapping device there is further provided a pair of feed rollers 232, 233, one of these driven pairs of rollers 232 being adjustably arranged in inclined slots 234; one of the rollers 232 is moreover pressed by means of springs 235 against the other roller 233 supported in fixed bearings 236 of the plate 122. (Fig. 35.) The means permitting to adjust the roller 232 consist of two arms 238, which are mounted on an axis 237 passing through the roller 233 and which arms lie against the fulcrum pins of the roller 232, and of a lever 239 also mounted on said shaft and acted upon by a tension spring 240, which brings said lever within reach of a lifting disk 241 (Figs. 1, 6 and 32). The disk 182 transmits by means of a belt 242 (Fig. 6) an intermittent rotary motion to the roller 232.

The labels 153 are carried in the following manner by the hereinbefore described device from the magazine 185—187 to the wrapping device: The shaft 205 with the disks 209 is rotated in the direction of the arrow shown in Fig. 4. The lifting cam 22 moves the two suction plates 189 at first toward the free end of the lowermost sheet of the pile of sheets 153 situated above the slot 188 and the air pump 203 acts upon the front corners of said lowermost sheet. The latter is then separated from the pile during the following downward movement of the two suction plates and it is bent downward into the position shown in Fig. 45 being then brought into contact with the circumference of the two disks 209. While the suction plates remain now for a short time together with the lowermost sheet in this position, the grippers 210 of the disks 209 are moved toward the downward bent sheet end. At the time that the disks 209 with their slots 214 are moved below said bent end of the lowermost sheet and that the latter falls in the outer end of the slots, the arms 212 of the gripper are caused to move with their rolls suddenly along the slope 207 of the recesses 206 provided in the disks 204 (Fig. 44). This causes the two revolving grippers 210 acted upon by the tension spring 213 to move with their jaws 210 suddenly backward as regards the direction of rotation of the disks 209, so that they seize the sheet end placed in the slots 214 and they hold this end securely between them and the disks 209 inside the suction plates 189.

The sheet 153 seized by the grippers 210 and lying upon the revolving disks is now carried away from the pile and it is conveyed below the pressure rolls 217 (Fig. 46). As soon as the arms 212 of the grippers with their rolls come into contact with the inclined cam parts 208 of the disks 204, the grippers release the sheet, so that the latter can be fed by means of the disk 209 and the pressure rollers 217, working together with said disks, into the vertical guide part 216 (Fig. 47). During each revolution of the shaft 205, respectively of the lifting cam 19, the hereinbefore described working cycle is repeated, one sheet after the other being separated from and drawn off the pile.

As soon as a sheet reaches the guide piece 216, whereby one of its side-edges (in Fig. 1 it is the left side-edge) is placed between the cylinder 222 and the roller 226 and this roller 226, which till now was kept away from the cylinder owing to the action of the cam disk 230, is now released. The torsion spring 228 presses then the roller 226 against the cylinder 222, so that the sheet is placed over the latter. At the same time a rotary movement is imparted to the cylinder 222 and to the roller 226, so that the sheet is drawn out of the guide 216 and fed into the guides 231 and to three of its edges there is applied gluten, as shown in Fig. 31. The moment the sheet has passed the cylinder 222, the lifting cam 230 lifts the roller 226 of the cylinder (Fig. 34), to prevent said roller from coming in contact with the cylinder. The sheet is now seized by the two rotating feed rollers 232 and 233, acted upon by the springs 235 and pressed by the latter one against another, and it is then fed to the wrapping rollers of the wrapping device. As soon as the sheet has been passed through the feed rollers 232, 233, the roller 232 is lifted off the roller 233 by means of the lifting cam 241 of the wheel 53 (Fig. 6), the arms 238 moving thereby the roller 232 outward in the inclined slots 234 (Fig. 35) at the same time the wheel 24 stops the roller 232.

After having described the construction and the working of the separate devices of the machine, we will now describe how these devices act together when it is desired to produce a chocolate roll from chocolate disks.

As already stated, the table 49 is rotated intermittingly through an angle of 90°. Before the table 49 is brought to a standstill the nose 92 of one of the empty receptacles 80 takes a disk $k$ of cardboard out of the receptacle 89, whereby said disk drops into the receptacle 80. As soon as the table is brought to a standstill, the feed wheel 69, 70 conveys twelve chocolate disks $s$ into the receptacle 80, which is now filled. The holder 71 causes the disks $s$ to fall in such a manner into said receptacle, that their larger and smaller sides lie alternately one upon another, the larger side of the uppermost and lowermost disks $s$ being directed outward. (Figs. 29 and 30.) After the receptacle 80 has been filled, the wheel 24 stops for a short time the feed band 63 and the feed wheel 69, 70 with the holder 71. While the table 49 is now again rotated, a disk $k$ is taken out of the second receptacle 89 and it falls upon the uppermost chocolate disk $s$ in the receptacle 80. As soon as the table 49 and the filled receptacle 80 are moved near the magazine 185—187 of the feed device for the labels (Fig. 4), the table 49 remains stationary for a short time, while nothing is done as regards the pile of disks.

During the following intermittent movement of the table 49, the filled receptacle 80 is brought within reach of the wrapping device. While the pile of disks is now seized during the standstill of the table by the two rods 100 and 101 to be fed between the wrapping rollers 124, 125, the scissors 163, 164 cut a cardboard strip 152 from the cardboard band 156, a sheet 153 being taken simultaneously off the pile in the magazine 185—187 and conveyed into the guide 216. When the pile of disks has been introduced between the wrapping rollers, the latter are rotated and the strip 152 is pushed by the feed rollers 158, 159, 173, 174, and the sheet 153 pushed by the feed rollers 222, 226 and 232, 233 (Fig. 6) between the wrapping rollers, both envelops being then wrapped round the pile of disks (Fig. 29) and the projecting edges of the envelop 153 being at the same time folded down on the cardboard disk $k$ and pasted on the latter. The chocolate roll is now finished. After the finished chocolate rolls have been pushed back into the receptacle 80, the table 49 is rotated through another stage, the chocolate roll being conveyed through the pipe 99 out of the machine while the table remains stationary. The table is now rotated through the last quarter of a complete revolution and the empty receptacle is again conveyed in front of the holder 71 and the feed wheel 69, 70 to take up a new pile of disks, whereupon the hereinbefore working cycle is repeated.

It is evident, that while a pile of disks is formed at one stopping place of the table, the previously formed pile is simultaneously wrapped up at the opposite stopping place, the finished chocolate roll falling at the same time out of the machine at a third stopping place. This mechanical and automatic piling up of the chocolate disks has the advantage, as regards the piling up of the disks by hand, that the work is done quicker and in a more reliable manner and that it is much better done in respect of the number of disks to be piled up and the relative position of the disks one to another.

A further advantage of the wrapping device with regard to already known similar devices consists in that the provision of a complete ring of wrapping roller having a relatively small diameter permits to obtain a larger supporting surface, $i. e.$ a better guide for the envelops and to eliminate large spaces between the rollers, so that the envelops are prevented from moving out of the rollers while the wrapping operation is proceeding. As the wrapping rollers are continually rotated during the wrapping operation, when the envelops are fed between these revolving rollers, it is possible to wrap the envelops acted gradually upon by the rollers in an even and taut manner round the bodies, so that a good and tidy packing is obtained. A further advantage consists in that the casing 121 and the roller part 125 are adjustably mounted, so that the machine may be used for wrapping up piles of disks of different length.

Instead of the cylindrical rolls consisting of separate round disk-like bodies (chocolate disks) there may also be wrapped up other cylindrical bodies and instead of wrapping up the latter in two envelops they may as well be wrapped up in only one.

It is evident, that there can be provided also only one disk instead of the two disks 204 and 209, the disk 209 forming in this instance a cylinder provided with only one gripper extending over the whole length of the machine.

I claim:

1. In a packing and wrapping machine, a table having step-wise rotation, receiving means for the articles on said table, means to supply a definite number of articles to said means during the pause of the table, a wrapping mechanism, means to transfer the articles during a subsequent pause of the table to said wrapping mechanism and means to support the articles during transfer.

2. In a packing and wrapping machine, a table having step-wise rotation, a container on said table, means to stack the articles in said container during a pause of said table, a wrapping mechanism adjacent the table, mechanism operative during a subsequent pause of the table to transfer the stack to said wrapping mechanism for wrapping and to return the wrapped stack to said container.

3. In a packing and wrapping machine, a table having step-wise rotation, receiving means on said table, means to deliver the articles to said receiving means during a pause of said table and including means for reversing every alternate article, wrapping mechanism and means operating during a subsequent pause of said table to engage the ends of the stack in the receiving means and transfer it to said wrapping mechanism, and mechanisms to feed a plurality of wrappers in different directions to said wrapping mechanism and stack.

4. In a packing and wrapping machine, a table having step-wise rotation, a plurality of open-ended receptacles thereon, means to stack articles in said receptacles during a pause of said table, a wrapping mechanism, means to transfer a stack of articles from one receptacle to said wrapping mechanism while stacking articles in another receptacle and means to support the articles during the transfer.

5. In a packing and wrapping machine, a table having step-wise rotation, receiving means on the table for the articles, means for stacking articles in said receiving means including mechanism to reverse alternate articles, a wrapping mechanism, and devices operating to engage the stack and transfer it to said wrapping mechanism.

6. In a packing and wrapping machine, a table having step-wise rotation, a vertical container on said table, a rotatable holder for initially receiving the articles, a rotatable feed wheel for inserting the articles into the holder and causing an article contained in the holder to be ejected therefrom into said container during a pause of said table, means to rotate the holder half a revolution after the insertion of alternate articles, a wrapping mechanism, and means to transfer a stack of articles from a container to said wrapping mechanism.

7. In a packing and wrapping machine, a table having step-wise rotation, containers mounted on said table, an endless conveyer band to forward articles to the machine, a periodically rotatable holder for initially receiving the articles from said band, a feed wheel having arms to move said articles from said band into said holder, means to rotate the holder half a revolution to reverse alternate articles, a wrapping mechanism and means to move the stack of articles to said wrapping mechanism.

8. In a packing and wrapping machine, a table having step-wise rotation, a container thereon, an endless carrier, a stop to stop the articles on said carrier, a rotatable holder, a rotatable armed feed wheel to engage an article lying against said stop and move it into said holder, means to periodically rotate the holder to reverse alternate articles, a wrapping mechanism and mechanism to transfer a stack of articles from said container to said wrapping mechanism.

9. In a packing and wrapping machine, a step-wise rotatable table, an open-ended container, a feed mechanism to supply a definite number of articles singly to said container, movable means to enter said container during a pause of said table to support the stack and to maintain a substantially constant distance of drop for the articles during the stacking thereof in said container, means on the table to hold the stack during the removal of said movable means from the receptacle and during the movements of the table, a wrapping mechanism and means to endwise engage the stack and move it from said container to said wrapping means.

10. In a packing and wrapping machine, a step-wise rotatable table, an open-ended container thereon, a removable bottom for the container, means to singly feed a definite number of articles to said container, means to cause said bottom to descend during the filling of said container, means on the table to engage and hold the stack after the removal of said bottom and during the movement of said table, a wrapping mechanism, and means to transfer a stack of articles from said container to said wrapping mechanism.

11. In a packing and wrapping machine, a step-wise rotatable table, an open-ended container thereon, means to singly feed a definite number of articles to said container, a bottom vertically movable through said table into the container, means to step-wise withdraw said bottom in accordance with the filling of said receptacle and withdraw it when filled, a pair of stack supporting jaws mounted on the table beneath the receptacle, means to open the jaws to permit the insertion and withdrawal of said bottom, a wrapping mechanism, and means to transfer the stack to said wrapping mechanism.

12. In a packing and wrapping machine, a step-wise rotatable table, a container on said table, mechanism to singly supply a definite number of articles to said container, means to supply a package end to said container while it is being moved into filling position, and means to supply a second such package end when moving out of filling position, wrapping mechanism, and means to engage the stack of articles with the package ends and move them to said wrapping mechanism.

13. In a packing and wrapping machine, a step-wise rotatable table, a container thereon, mechanism to singly feed a definite number of articles to said container during a pause of the table, two package end magazines in the path of said receptacle, one magazine before and the other after the filling position of said container, said container coöperating with said magazines to remove a package end therefrom during the passage of said container thereunder, a wrapping mechanism and mechanism to transfer the stack from the container to said wrapping mechanism.

14. In a packing and wrapping machine, a table having step-wise rotation, a vertical container on said table, means to singly feed a definite number of articles to said container, a circular series of wrapping rolls, means to radially move the rolls to permit the insertion and withdrawal of a stack of articles; means to engage the ends of the stack and move it longitudinally between the rolls and hold it during the wrapping operation, means to supply a wrapper to said rolls, and means to impart relative rotation to said series of rolls and stack.

15. In a packing and wrapping machine, a step-wise rotatable table, a vertical container thereon, means to singly feed a definite number of articles to said container, a circular series of wrapping rolls, means to radially move the rolls to permit the insertion and withdrawal of a stack of articles; means for engaging the ends of the stack to move it longitudinally between the rolls, hold it during the wrapping operation and return the wrapped stack to said container, means to feed a wrapper to said rolls, means to revolve the rolls about the stack to apply the wrapper thereto, and means to fold the ends of the wrapper down onto the ends of the stack.

16. In a packing and wrapping machine, a step-wise rotatable table, a vertical open-ended container thereon, mechanism to singly feed a definite number of articles to said container, wrapping rolls arranged in a circle, means to seize the ends of a stack of articles in said container and move the stack to the wrapping rolls, means to radially move the rolls to permit the insertion of the stack, to move the rolls to engaging position for wrapping, and to again radially move the rolls for withdrawal of the wrapped stack, means to feed a wrapper between the rolls and stack, means to fold down the edges of the wrapper onto the ends of the stack, and separate, spaced simultaneously rotated casings in which the ends of the rolls are journaled and between which the wrapper is fed to the rolls.

17. In a packing and wrapping machine, a step-wise rotatable table, a plurality of vertical open-ended containers thereon, mechanism to singly feed a definite number of articles to said container, a plurality of circularly arranged wrapping rolls, spaced casings in which the ends of the rollers are mounted, means to rotate and simultaneously revolve the rollers in unison, two simultaneously rotatable disks having non-radial slots therein in which the ends of said rolls have bearing, means to simultaneously rotate the disks to radially move the rolls, means to move the stack from a container to said rolls, means to feed a wrapper to said rolls and stack, and radially movable folding devices to fold the ends of the wrapper down onto the stack.

18. In a packing and wrapping machine, a step-wise rotatable table, a plurality of vertical open-ended containers thereon, mechanism to singly feed a definite number of articles to said container, a plurality of wrapping rolls arranged in a circle, means to radially move the rolls, a pinion on each roll and movable therewith, stationary pins, a pinion on each pin, links movably connecting the rolls in pairs to said pins while maintaining the three pinions in mesh, means common to all the pinions on said pins to rotate them and thereby drive the rolls, means to endwise engage a stack of articles and move it axially between the rollers, means to feed a wrapper to said rolls, and means to fold down the ends of the wrapper on the stack, whereupon said engaging means returns the wrapped package to said container.

19. In a packing and wrapping machine, a step-wise rotatable table, a plurality of open-ended containers thereon, mechanism to stack articles in a container during a pause of the table, a plurality of wrapping rolls arranged in a circle, means to radially move the rolls, means to engage and move a stack from a receptacle to said rolls, means to feed a wrapper to said rolls, two spaced casings for said rolls in which said rolls are mounted, folding members mounted in radial guides in said casings, a ring in each casing having cam slots for actuating the folding members, means to simultaneously rotate said rings to cause said members to fold the ends of the wrapper down onto the stack, and means to remove the wrapped package from the rolls.

20. In a packing and wrapping machine, a step-wise rotatable table, a plurality of open-ended containers thereon, means to stack articles in a container during a table pause, a plurality of wrapping rolls simultaneously driven, means to radially move the rolls, means to engage a stack and transfer it from a container to said rolls, means to feed a wrapper to said rolls and stack, means to rotate and revolve the rolls to wrap the stack, means to fold the ends of the wrapper down on the stack ends, two spaced casings in which the ends of the rolls are mounted, one of said casings being axially adjustable.

21. In a packing and wrapping machine, a step-wise rotatable table, a plurality of open-ended containers thereon, mechanism for singly stacking a definite number of articles in a container during a table pause, a plurality of rotatable and revoluble wrapping rolls arranged in a circle, means to radially move the rolls, two axially spaced casings, mechanism therein for rotating the rolls, said casings also containing the radial roll moving means, folding means in said casings to fold the edges of a wrapper over the ends of the stack, two alined longitudinally movable rods co-axial with said casings, an adjustable pin in each rod, said rods to endwise engage a stack in a container alined therewith and move said stack to said rolls for wrapping it and back into said container after wrapping.

22. In a packing and wrapping machine, a step-wise rotatable table, a plurality of open-ended containers thereon, means to singly stack a definite number of articles in a container during a table pause, a plurality of vertically arranged wrapping rolls beneath the table, means to feed a wrapper to said rolls, two axially alined casings, means therein to rotate the rolls, folding means in said casings, two alined rods movable axially of said casings and rolls, one of which rods has a spring-urged pin in its end and the other rod has a co-axially movable pin, a latch to hold said pin with relation to its rod, and means to release the latter pin before engaging a stack and moving it to said rolls.

23. In a packing and wrapping machine, a step-wise rotatable table, a plurality of open-ended containers thereon, mechanism to singly stack a definite number of articles in a container during a table pause, means to supply to a container before coming to filling position and after leaving filling position a card board disk, a series of wrapping rolls arranged in a circle, means for feeding two wrappers of different widths, one having pasted edges, to said rolls from opposite directions and one in advance of the other, means to transfer a stack of articles from its container to the rolls, and means to fold down the projecting pasted edges of the wider strip onto the card board ends of the stack.

24. In a packing and wrapping machine, a step-wise rotatable table, a plurality of open-ended containers thereon, means to stack articles in a container during a table pause, means to deliver to said container a card board package end before entering and after leaving filling position; wrapping rolls, means to feed a narrow wrapper from a continuous strip to said rolls, means to sever said strip, means to feed a second, wider, wrapper to said rolls, means to paste said wider wrapper on three edges during the feeding operation, and means to fold down the pasted edges of the wider strip onto the card board ends, said delivering means then returning the package to its container.

25. In a packaging machine, a step-wise rotatable table, a plurality of open-ended containers on said table, means to stack articles in a container during each table pause, means to deliver to each container a package end when coming into and when leaving its filling position, vertically arranged wrapping rolls beneath said table, means to feed and sever a narrow wrapper from a continuous strip and deliver the severed portion to said rolls, means to feed a pasted, wider, wrapper to the rolls, means to radially move the rolls to permit the entry and removal of the stack of articles, means to endwise engage the stack in the container and vertically move it through the table to said rolls and rotatably support said stack during the wrapping operation and return the finished package to its container, and means to fold down the pasted edges of the wrapper onto the card board ends of the stack.

In testimony that I claim the foregoing as my invention, I have signed my name in presence of two subscribing witnesses.

JEAN DE BLONAY.

Witnesses:
JULES CUCUOD,
JULES DUPANY.